US010721530B2

(12) United States Patent
Van Brandenburg et al.

(10) Patent No.: US 10,721,530 B2
(45) Date of Patent: Jul. 21, 2020

(54) PROVIDING TILE VIDEO STREAMS TO A CLIENT

(71) Applicant: KONINKLIJKE KPN N.V., Rotterdam (NL)

(72) Inventors: Ray Van Brandenburg, The Hague (NL); Emmanuel Thomas, Delft (NL); Mattijs Oskar Van Deventer, Leidschendam (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 14/908,024

(22) PCT Filed: Jul. 28, 2014

(86) PCT No.: PCT/EP2014/066139
§ 371 (c)(1),
(2) Date: Jan. 27, 2016

(87) PCT Pub. No.: WO2015/014773
PCT Pub. Date: Feb. 5, 2015

(65) Prior Publication Data
US 2016/0165309 A1    Jun. 9, 2016

(30) Foreign Application Priority Data

Jul. 29, 2013    (EP) ..................................... 13178401

(51) Int. Cl.
*H04N 21/4728*    (2011.01)
*H04N 21/6587*    (2011.01)
(Continued)

(52) U.S. Cl.
CPC ... *H04N 21/4728* (2013.01); *H04N 21/23412* (2013.01); *H04N 21/26283* (2013.01);
(Continued)

(58) Field of Classification Search
CPC ............... H04L 29/08072; H04L 29/06; H04L 29/0809; H04L 12/403; H04L 29/08144;
(Continued)

(56) References Cited

U.S. PATENT DOCUMENTS 7,894,531 B1 *   2/2011   Cetin ................... H04N 19/176
                                                                       375/240.19
9,699,465 B2     7/2017   Ouedraogo
(Continued)

FOREIGN PATENT DOCUMENTS

EP           1672925 1       6/2006
EP           2775701 A1    9/2014
(Continued)

OTHER PUBLICATIONS

The Notification of Transmittal of the International Search Report and the Written Opinion of the International Searching Authority, International Application No. PCT/EP2014/066139 filed Jul. 28, 2014, entitled:"Providing Tile Video Streams to a Client", dated Oct. 16, 2014.

(Continued)

*Primary Examiner* — Ngoc K Vu
(74) *Attorney, Agent, or Firm* — Hamilton, Brook, Smith & Reynolds, P.C.

(57) ABSTRACT

A method is described for providing one or more tile streams to a client device for rendering a region-of-interest (ROI), wherein said ROI defines a region of a tile representation of a source video and wherein said method comprises: rendering a region-of-interest (ROI) video stream comprising a ROI of said source video; receiving ROI position information of at least one frame of said ROI video stream; and, receiving one or more tile streams that are requested the basis of said ROI position information and a spatial manifest file, said spatial manifest file defining one or more tile (Continued)

representations of said source video, a tile representation comprising one or more tile identifiers for identifying one or more tile streams and a tile position information defining the spatial position of said tile streams.

19 Claims, 18 Drawing Sheets

(51) Int. Cl.
*H04N 21/234* (2011.01)
*H04N 21/262* (2011.01)
*H04N 21/643* (2011.01)
*H04N 21/235* (2011.01)
*H04N 21/8358* (2011.01)
*H04N 21/8547* (2011.01)

(52) U.S. Cl.
CPC ... *H04N 21/64322* (2013.01); *H04N 21/6587* (2013.01); *H04N 21/2353* (2013.01); *H04N 21/8358* (2013.01); *H04N 21/8547* (2013.01)

(58) Field of Classification Search
CPC ........... H04N 21/4728; H04N 21/6587; H04N 21/8547; H04N 21/8358; H04N 21/23412; H04N 21/2353; H04N 21/64322; H04N 21/26283
See application file for complete search history.

(56) References Cited

U.S. PATENT DOCUMENTS

| | | |
|---|---|---|
| 9,749,627 B2 | 8/2017 | Wu |
| 9,794,649 B2 | 10/2017 | Denoual et al. |
| 9,860,572 B2 | 1/2018 | van Deventer et al. |
| 9,883,011 B2 | 1/2018 | Denoual et al. |
| 9,906,807 B2 | 2/2018 | Denoual et al. |
| 10,182,241 B2 | 1/2019 | Li et al. |
| 10,200,721 B2 | 2/2019 | Denoual et al. |
| 10,212,491 B2 | 2/2019 | Denoual et al. |
| 10,257,247 B2 | 4/2019 | Denoual et al. |
| 10,397,666 B2 * | 8/2019 | Thomas ............... H04N 19/119 |
| 10,542,258 B2 | 1/2020 | Wang et al. |
| 10,542,274 B2 | 1/2020 | Li |
| 10,547,914 B2 | 1/2020 | Denoual et al. |
| 2006/0120610 A1 | 6/2006 | Kong et al. |
| 2006/0262345 A1 | 11/2006 | Le Leannec et al. |
| 2009/0300692 A1 | 12/2009 | Mavlankar et al. |
| 2010/0135575 A1 | 6/2010 | Guo |
| 2010/0232504 A1 * | 9/2010 | Feng ................... H04N 19/176 375/240.13 |
| 2011/0096990 A1 | 4/2011 | Lu |
| 2013/0235270 A1 * | 9/2013 | Sasaki ............... H04N 21/4622 348/564 |
| 2014/0079126 A1 | 3/2014 | Ye et al. |
| 2014/0089990 A1 | 3/2014 | van Deventer et al. |
| 2014/0341549 A1 * | 11/2014 | Hattori .................. H04N 19/70 386/354 |
| 2015/0032901 A1 * | 1/2015 | Wang .................. H04L 65/4092 709/231 |
| 2015/0095450 A1 | 4/2015 | Vitthaladevun |
| 2015/0208103 A1 * | 7/2015 | Guntur .................. H04N 19/46 725/61 |
| 2015/0237166 A1 | 8/2015 | Denoual et al. |
| 2015/0264404 A1 | 9/2015 | Hannuksela |
| 2016/0182927 A1 | 6/2016 | Denoual et al. |
| 2017/0013279 A1 | 1/2017 | Puri et al. |
| 2017/0118540 A1 | 4/2017 | Thomas et al. |
| 2017/0155912 A1 | 6/2017 | Thomas et al. |
| 2017/0180444 A1 * | 6/2017 | Denoual ............. H04L 65/601 |
| 2017/0223083 A1 | 8/2017 | Maze et al. |
| 2018/0242028 A1 | 8/2018 | Van Brandenburg et al. |
| 2018/0295400 A1 | 10/2018 | Thomas |
| 2019/0208234 A1 | 7/2019 | Van Brandenburg et al. |

FOREIGN PATENT DOCUMENTS

| | | |
|---|---|---|
| EP | 2 814 243 | 12/2014 |
| GB | 2505912 | 3/2014 |
| GB | 2 513 139 | 10/2014 |
| GB | 2524531 | 9/2015 |
| JP | 2005142654 | 6/2005 |
| JP | 2012049806 | 3/2012 |
| WO | WO 2001/95513 A1 | 12/2001 |
| WO | 2008/088772 | 7/2008 |
| WO | WO 2009/003885 A2 | 1/2009 |
| WO | WO 2012/168356 | 12/2012 |
| WO | WO 2012/168365 A1 | 12/2012 |
| WO | WO 2013/063094 | 5/2013 |
| WO | WO 2014/057131 | 4/2014 |
| WO | WO 2014/0106651 | 7/2014 |
| WO | WO 2014/111423 | 7/2014 |
| WO | WO 2014/168972 | 10/2014 |
| WO | 2015/011109 | 1/2015 |
| WO | WO 2015/004276 A2 | 1/2015 |
| WO | WO 2015/008774 A1 | 1/2015 |
| WO | WO 2015/014773 A1 | 2/2015 |
| WO | WO 2015/059194 | 4/2015 |
| WO | WO 2015/104451 | 7/2015 |
| WO | WO 2015/197815 A1 | 12/2015 |
| WO | WO 2015/197818 A1 | 12/2015 |
| WO | 2017/029400 | 2/2017 |
| WO | 2017/029402 | 2/2017 |
| WO | WO 2017/060423 | 4/2017 |

OTHER PUBLICATIONS

Mavlankar, A., et al., "An Interactive Region-of-Interest Video Streaming System for Online Lecturing Viewing," *Packet Video Workshop (PV) 18th International IEEE*, pp. 64-71 (2010).
The European Search Report for EP 13178401.9, dated Oct. 2, 2013.
Giladi, A. et al, "Descriptions of Core Experiments on DASH Amendment," Systems subgroup/DASH, International Organisation for Stardardisation Organisation Internationale de Normalisation ISO/IEC JTC1/SC29/WG11 Coding of Moving Pictures and Audio, ISO/IEC JTC1/SC29/WG11 MPEG2013/N13977, Geneva, Switzerland, 24 pages (Nov. 2013).
Hirabayashi, M. et al, "Improvement on HEVC Tile Track for WD of 14496-15 AMD1," SONY Corporation Proposal, International Organisation for Stardardisation Organisation Internationale de Normalisation ISO/IEC JTC1/SC29/WG11 Coding of Moving Pictures and Audio, ISO/TEC JTC1/SC29/WG11 MPEG2014/M33083, Valencia, Spain, 4 pages (Mar. 2014).
Hannuksela, M.M., et al., "Isolated Regions in Video Coding," IEEE Transactions on Multimedia, 6(2): 259-267 (Apr. 1, 2004).
Wang, Y-K., et al., "Tile Groups," Joint Collaborative Team on Vide Coding (JCT-VC) of ITU-T SG16 WP3 and ISO/IEC JTC1/SC29/WG11, 7th Meeting: Geneva, CH, pp. 1-9 (Nov. 21-30, 2011).
YYe, Y., et al., "ROI Tile Sections," MPEG Meeting, Shanghai, pp. 1-7 (2012).
Concolato, C., et al., "Usage of DASH SRD for HeVC Tiling," ISO Contribution ISO/IEC JTC1/SC29/WG11 MPEG2014 (2014).
Hirabayashi, M., et al., "Consideration on HEVC Tile Tracks in MPD for DASH SRD," ISO Contribution ISO/IEC JTC1/SC29/WG11 MPEG2014 (2014).
Sanchez, et al., "Low Complexity Cloud-video-mising using HEVC," 11th annual IEEE CCNC—Multimedia networking, services and applications, 214-218 (2014).
Tokumo, Y, et al., "Dash: Signaling Tile Encapsulation Modes," ISO Contribution ISO/IEC JTC1/SC29/WG11 MPEG2014 (2014).
U.S. Office Action for U.S. Appl. No. 15/318,631, entitled: Determining a Region of Interest on the Basis of a HEVC-Tiled Video Stream, dated Oct. 16, 2017.
Lee, et al., "Scalable roi Algorithm for H.264/SVC-based Video Streaming," Consumer Electronics, IEEE Transactions 57(2): 882-887 (2011).
Le Feuvre, J., et al., "Support for Efficient Tile Access in the HEVC File Format," Telecom Paris Tech, Canon Research Centre France (2013).

(56) References Cited

OTHER PUBLICATIONS

U.S. Final Office Action in U.S. Appl. No. 15/318,631, entitled "Determining a Region of Interest on the Basis of a HEVC-Tiled Video Stream." dated Jul. 19, 2018.
U.S. Final Office Action in U.S. Appl. No. 15/318,631, entitled "Determining a Region of Interest on the Basis of a HEVC-Tiled Video Stream." dated Feb. 1, 2019.
Wang, et al., U.S. Appl. No. 61/858,911, filed Jul. 26, 2013, entitled: On Spatial Adaptation in DASH.

* cited by examiner

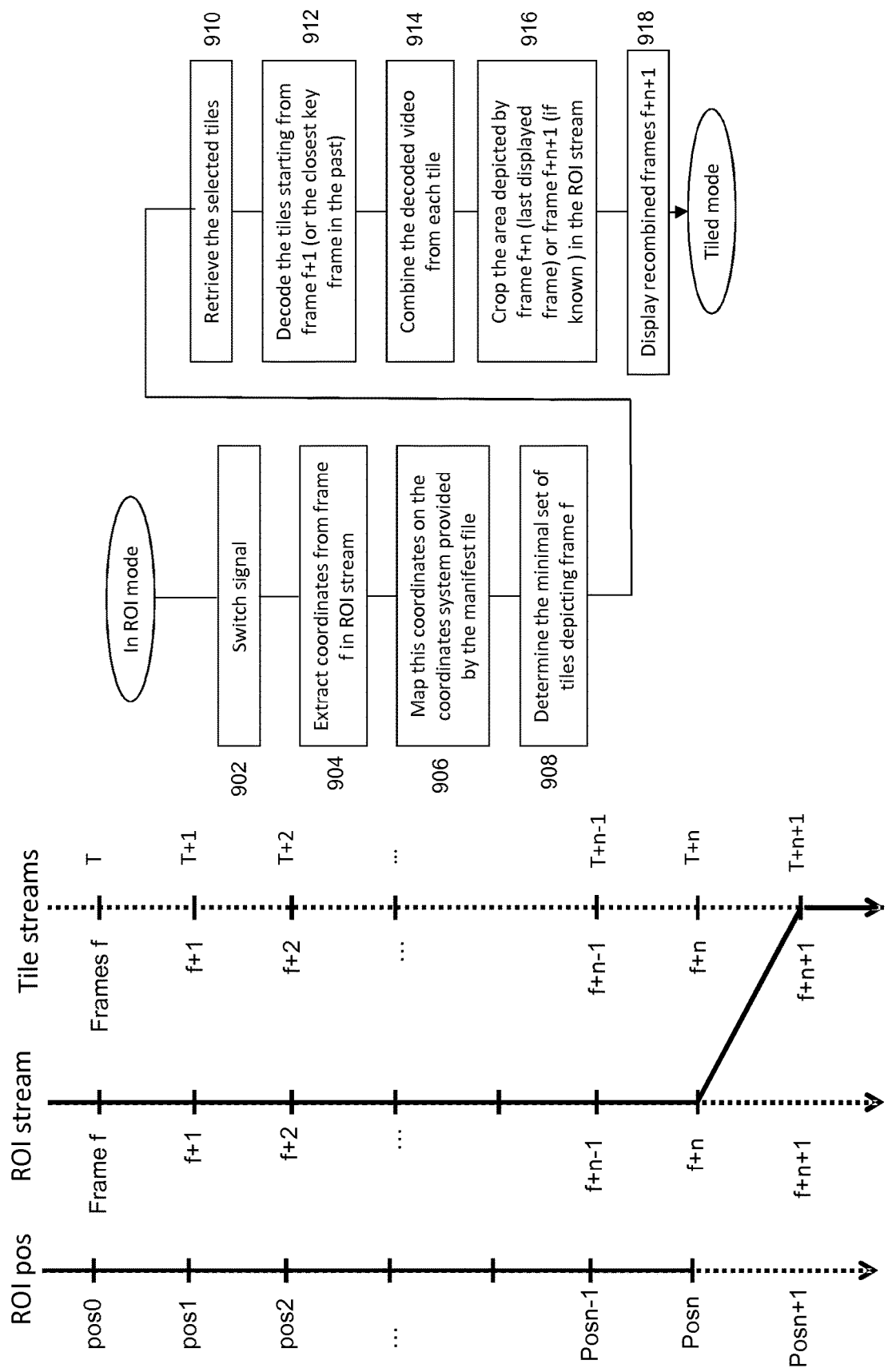

(A)
```
<ROI>
  <AbsoluteTime 1367584123.964324/>
  <PixelX1Y1X2Y2 0,1920,0,1080/>
</ROI>
<ROI>
  <AbsoluteTime 1367584125.516395/>
  <PixelX1Y1X2Y2 192,1728,108,972/>
</ROI>
<ROI>
  <AbsoluteTime 1367584127.234736/>
  <PixelX1Y1X2Y2 212,1748,108,972/>
</ROI>
```

(B)
```
<ROI>
  <RelativeTime 0/>
  <NormalizedXYzoom 0,0,1/>
</ROI>
<ROI>
  <RelativeTime 1.7523/>
  <NormalizedXYzoom 0,0,0.5/>
</ROI>
<ROI>
  <RelativeTime 5.89654/>
  <NormalizedXYzoom 0.5,0.5,0.5/>
</ROI>
```

(C)
```
<FrameNumber 1752/>
<PixelXYWH 50,70,640,480/>
<RadialNormalizedXYR 0.43,0.85,0.23/>
<SpeedPixeldXdYdWdH> 2.3,0,-0.01,-0.01/>
```

Fig. 10

```xml
<?xml version="1.0" encoding="iso-8859-1" ?>
<Pmt>
    <Pid>0x1B62</Pid>
    <TableId>0x2<//TableId>
    <SectionSyntaxIndicator>0x1</SectionSyntaxIndicator>
    <ProgramNumber>0x44D</ProgramNumber>
    <VersionNumber>0x1</VersionNumber>
    <CurrentNextIndicator>0x1</CurrentNextIndicator>
    <SectionNumber>0x0</SectionNumber>
    <LastSectionNumber>0x0</LastSectionNumber>
    <PcrPid>0x1B63</PcrPid>

<Stream>
        <StreamType>0x2</StreamType>
        <ElementaryPid>0x1B63</ElementaryPid>
    </Stream>

<Stream>
        <StreamType>0x3</StreamType>
        <ElementaryPid>0x1B64</ElementaryPid>
    </Stream>

<Stream>
        <StreamType>0x20</StreamType>
        <ElementaryPid>0x1B66</ElementaryPid>
    </Stream>
</Pmt>
```

Fig. 11

PROVIDING TILE VIDEO STREAMS TO A CLIENT

This application is the U.S. National Stage of International Application No. PCT/EP2014/066139, filed Jul. 28, 2014, which designates the U.S., published in English, and claims priority under 35 U.S.C. §§ 119 or 365(c) to EP Application No. 13178401.9, filed Jul. 29, 2013. The entire teachings of the above applications are incorporated herein by reference.

FIELD OF THE INVENTION

The invention relates to providing tile video streams to a client, and, in particular, though not exclusively, toad method for providing one or more tile video streams to a client, a device comprising a client configured for rendering a region-of-interest on the basis of said tile video streams, a video processor for forming a region-of-interest (ROI) stream, a non-transitory computer-readable storage medium for storing video streams and data structures and a computer program product using such method.

BACKGROUND OF THE INVENTION

Advances in camera and image processing technology enable the recording and processing of content in ever higher resolutions and larger image formats. In order to handle and control the high bandwidth requirements of such formats and to allow the play out of these formats on user equipment with limited display capabilities, the large field-of-view image region of the frames of such high-resolution stream may be spatially divided into a grid of areas (which are usually referred to as tiles, segments or slices). The data in these tile areas of the image region may be encoded as separate streams so that they can be stored and distributed independently of each other. In this disclosure such stream may be referred to as a tile stream, which may be interchangeably used with the term 'tile video stream'. A tile stream may comprise a sequence of tile frames that can be played out by a client according to a particular content, preferably play-out, timeline. The tile stream thus comprises frames that relate to a subregion (e.g. 'the tile' or 'tile area') of the image region, having a fixed (spatial) position (e.g. having fixed/static co-ordinates) within the image region. In other words its 'spatial position' in the image region does not change over time. The (static) position of this subregion within the image region may be defined by so called "tile position information".

A user may select a region-of-interest (ROI) within the image region of frames of a high-resolution stream and a client may subsequently request the set of tile streams that are associated with the selected ROI. Upon reception of the requested tile streams, the client may decode the streams and stitch the decoded tile frames together so that a seamless image of the selected ROI can be displayed to the user. This process may be referred to as tiled streaming.

When moving the ROI within a large field-of-view image region (e.g. via a panning-, zoom- or tilting action by the user) different sets of tile streams need to be delivered to the client in order to render a seamless view of the newly selected ROI's to the user. This way, tiled streaming allows a user to interact with the content.

Typically tiles (i.e. tile streams) are delivered to a client using an adaptive streaming protocol. In these implementations a client (i.e. client device) may be provided with a so-called spatial manifest file that comprises one or more different tile representations of a source video, typically a large field-of-view area, high-resolution source video, wherein a tile representation may define a set of tile streams of a predetermined tile format in terms of e.g. resolution and/or tile size, and/or tile position. The spatial manifest file may further comprise tile stream identifiers (e.g. URLs) for determining one or more delivery nodes in the network that are configured for delivering the tile streams to the client. On the basis of the spatial manifest file, the client can handle changes in the user-selected ROI and/or tile representation and the associated requests for tile streams from a server or a content delivery network (CDN). Advantageous implementations of content delivery networks (CDNs) that are configured for efficiently delivering content on the basis of tile streams and clients that are configured for receiving and processing tile streams are described in WO2012/168365.

In many user scenarios however, it is not necessary, or even desired that the content is continuously played out by the client as a set of tiled streams. In case of a soccer match a user may only be interested in interacting with the media stream at certain points in time, e.g. when an off-screen foul is made but the camera operator decides to follow the ball instead. Moreover, in terms of bandwidth and processing load of the client, it is desired to reduce the number of streams that are needed for displaying a ROI of large field-of-view image region as for each tile stream a separate instance of a decoder should be started.

In the article by Mavlankar at al, "Interactive region-of-interest video streaming system for online lecture viewing", a tiled streaming system is described that comprises a tracking mode and a user control mode. The user mode is a tile stream mode wherein the user may select a ROI that is associated with a set of tile streams. The tile streams are received and processed by the client such that a user-selected ROI is rendered. In the tracking mode, a ROI is determined by a tracking algorithm (a "virtual camera operator") that can track an object in an image. A ROI stream (in the article referred to as a "tracking tile") is generated by directly cropping the ROI from the (high-resolution wide-area format) source video. The tracking mode is thus a non-tiled mode wherein the ROI is streamed in a single stream to the client and there will be no switching between different tile streams for rendering a display of the ROI. A user can passively follow a moving ROI in the video (e.g. the position of the ball in a football match), without having to actively navigate around the large field-of-view image region himself.

The tracking mode concept as described in Mavlankar was developed within the context of online lecture viewing. However, it does not provide the ability to perform seamless switching between the ROI in the tracking mode and the ROI in the user control mode. Such switching functionality would be desired in more general content broadcast and streaming applications. For example if a user is watching a soccer match in the tracking mode (e.g. watching the studio 'cut' edited by the director), a user may want to explore in a seaming less fashion the area where a foul was made, without having to switch to a different mode, thereby interrupting the video, and without having to first look for the particular ROI in the large field-of-view 'fingernail' picture in the user control mode, as such action would seriously disrupt the continuous user experience. In addition, in certain implementations, it may not be desirable or feasible at all to always provide a 'fingernail' view of the source video's 'full image view', as suggested by Mavlankar. Even moreso, a 'fingernail' view for ROI selection may be inadequate and cumbersome, if the full image view is large compared to the (user determined) ROI that is desired. Such may be the case if the full image view is large and provides lots of detail, and more in particular when for instance zooming in combination with panning is performed during ROI selection.

Hence, there is a need in the art for improved methods and systems that enable efficient streaming a region of interest in frames with a large field-of-view area to a client. Further, the is a need in the art enabling smooth or even seamless switching between streaming a region-of-interest on the basis of a single stream to a client (in a non-tiled mode) and the streaming of a region-of-interest on the basis of a set of tile streams to the client(in a tiled mode).

SUMMARY OF THE INVENTION

It is an objective of the invention to reduce or eliminate at least one of the drawbacks known in the prior art. In a first aspect the invention may relate to a method for providing one or more tile video streams to a client device, said one or more tile video streams being used for rendering on a display a Region-Of-Interest (ROI) defining a sub-region within an image region associated with a source video. In an embodiment, the method may comprise: receiving a Region-Of-Interest (ROI) video stream, for rendering a first ROI defining a first sub-region within an image region associated with said source video; providing ROI position information associated with at least one video frame of said ROI video stream received by said client device, said ROI position information comprising at least one first position of said first sub-region within said image region. In an embodiment, said ROI position information and tile position information may be used for determining one or more tile video streams associated with one or more tile sub-regions, at least part of said one or more tile sub-regions overlapping with said first sub-region, said tile position information comprising the positions of said one or more tile sub-regions within said image region; and, requesting said one or more tile video streams.

Hence, a ROI stream may form a sub-region within a full wide field-of-view image region of a source video. That is to say, the frames transported by the ROI stream may show when rendered on a display, an image view which is a subregion (e.g. a part) of the image view of the source video. During play out of the ROI stream, the ROI (the sub-region) may move within the full wide field-of-view (panoramic) image region of the source video. That is to say, the position of the area covered by this subregion within the image region of the source video (e.g. the ROI position information) may change over time. The position of the ROI (subregion) may be defined in terms of ROI coordinates. The source video may be one high-resolution video or it may be formed out of a number of source video's, e.g. different camera angles.

The invention is at least in part based on the insight that when both the (dynamic) ROI position information of the ongoing ROI stream and position information of (certain) tile streams are provided, a client device can determine which tile streams are needed (e.g. need to be requested) for making the switch, from watching part of the source video based as a result of rendering the ROI video stream towards watching part of the source video based as a result of rendering (of part of) one or more tile streams, appear in a seamless fashion. That is: When switching from the ROI stream to a tiled streaming mode, ROI position information comprising the position (ROI coordinates) of at least one image frame of a ROI video stream may be used to determine tile streams that the client device is going to use when starting the tile streaming mode. The coordinates of the position of the ROI of the ROI stream may be provided on frame level, i.e. video frames that have been received by the client device, so that a smooth or seamless transition to the tiled streaming mode can be realized.

Hence the image region as such may be pictured as a plane that is flat (e.g. only x and y co-ordinates, or curved, such as cylindrical (for example being built up from camera's positioned at all corners of a soccer pitch, or even take other curved shapes such as a bowl shape (for example wherein some camera's are also staged at different heights and position above the soccer pitch). One or more of these recordings taken together is an example of a source video. The thus formed source video may cover all or a substantial part of such soccer pitch from all possible angles.

In an embodiment, the ROI stream may be an MPEG and/or DVB encoded video stream.

In yet another embodiment, said ROI position information may comprise at least one look-ahead position associated with at least one video frame of said ROI video stream that is not yet received by said client device. In this embodiment, a video frame may be associated with ROI coordinates that are time-shifted. The time-shift compensates the movement of the (first) ROI during the time period between requesting the tile streams and processing the tile (video) streams by the client device. This way, the sub-region formed by the requested tile streams always comprises the requested ROI. This embodiment is particularly advantageous when dealing with the ROI stream comprising a dynamic ROI trajectory. In an embodiment the look-ahead position is complementary to the first position. In another embodiment the look-ahead position may replace the first position.

In an embodiment, providing said ROI position information may comprise: providing first ROI coordinates of at least a first image frame of said ROI video stream, said first ROI coordinates defining said first position of said first sub-region at the time of reception of an instruction, preferably a user-initiated instruction, by said client device, for rendering a second ROI on the basis of said one or more tile video streams. In this embodiment, the ROI coordinates of a frame that is processed by the client device at the moment the client device is instructed, e.g. via a user-interaction, may be used to determine the one or more tile streams that are needed for switching to the tile streaming mode(i.e. the rendering of a user-initiated ROI on the basis of tile streams instead of a ROI stream that renders a predetermined ("director-cut") ROI).

In a further embodiment, said instruction may comprise a ROI vector for indicating a change of said first sub-region and wherein said ROI vector is used for determining said one or more tile video streams. The ROI vector may be associated with a certain user-interaction, e.g. panning, zooming and/or tilting, and may be used for selecting a tile representation that is suitable for the requested user-interaction. The ROI vector may de defined in terms of vector co-ordinates. The ROI vector may define the size and direction (for example along x,y,z axis of the image region plane) of the motion of the ROI caused by the user-interaction. Motion along the z-axis may reflect a zooming action. Motion in the x,y plane may reflect panning. For tilting a further vector co-ordinate may be added (e.g. inclination). The vector may be represented as a collection of delta's of these vector co-ordinates.

In an embodiment, the method may further comprise: providing second ROI coordinates of at least a second image frame of said ROI video stream, said second ROI coordinates defining a second position of said first sub-region at the time of processing (e.g. receiving, buffering and/or decoding) said one or more tile streams by said client device. In this embodiment, detrimental effects due to movements of the ROI between the request of the tile streams and the processing of the tile streams by the client device may be reduced.

In an embodiment, said method may further comprise: rendering a second ROI on the basis of said one or more tile sub-regions and said first ROI coordinates and/or second ROI coordinates. In a further embodiment, the method may comprise:

forming a second sub-region on the basis of tile image frames associated with said one or more tile sub-regions and cropping said second ROI out of said second sub-region. The tile sub-regions may be used to form a second sub-region in the image region. The ROI coordinates may be used to create (crop) a second ROI out of the second sub-region so that a smooth transition to the tiled streaming mode is ensured.

In a further embodiment, if said second sub-region is formed on the basis of two or more tile sub-regions, forming said second sub-region including: synchronizing two or more tile image frames of said two or more tile video streams and stitching said synchronized tile image frames into said second sub-region.

In an embodiment, said at least one look-ahead position may comprises one or more time-shifted first ROI coordinates of one or more image frames in said ROI video stream that are not yet received by said client device, said time-shifted first ROI coordinates being provided to said client device prior to said one or more image frames. In a further embodiment, said time-shifted ROI coordinates may be associated with time-shift information, preferably a time stamp, for determining said time-shift. In this embodiment, ROI position information may time-shifted so that a client device may receive ROI position information ahead in time. This way the client may request the correct tile streams even when the ROI is very dynamic.

In an embodiment, said one or more tile video streams may be requested on the basis of a spatial manifest file comprising said tile position information, said tile position information comprising coordinates of said one or more tile sub-regions within said image region; said spatial manifest file further comprising one or more tile representations of said source video, a tile representation comprising one or more tile identifiers for identifying one or more tile video streams, preferably said one or more tile video streams being HTTP-based Adaptive Streaming type of streams. Hence, a (spatial) manifest file may be used to efficiently store all information of the tile streams at the client. Different tile representations comprising sets of tile streams of different quality, tile size, camera angle, etc. may be used in the tiled streaming mode.

In an embodiment, said ROI position information may comprise ROI coordinates defining at least one position of said first sub-region within said image region, said first sub-region being defined by at least one image frame of said ROI video stream.

In an embodiment, at least part of said ROI position information may be transported in the bit stream of said ROI video stream to said client device, preferably a SEI message, signalled by a ROI coordinates flag, indicating the presence of said ROI coordinates in said bit stream.

In an embodiment, at least part of said ROI position information may be transported in an MPEG transport stream to the client device, preferably in a packetized elementary stream in said MPEG transport stream; or, as a DVB-defined SAD (Synchronised Auxilary Data) packet in said MPEG transport stream, optionally said SAD packet comprising a time-shifted ROI coordinate.

In an embodiment, at least part of said ROI position information may be transported in a predefined box in an MPEG-4 stream, preferably in a moov, trak and/or stbl box of an MPEG-4 stream.

In an embodiment, at least part of said ROI position information may be transported in a metadata track in a MPEG-4 stream, preferably using a dedicated sample entry code.

In an embodiment, at least part of said ROI position information may be transported as a watermark to said client device, preferably as a watermark in said ROI video stream.

In a further aspect, the invention may relate to a device comprising a client configured for providing a region-of-interest (ROI) on the basis of one or more tile video streams, wherein said ROI defines a sub-region of an image region associated with a source video, said client being configured for: receiving a, preferably MPEG and/or DVB encoded, Region-Of-Interest (ROI) video stream, for rendering a first ROI defining a first sub-region within an image region associated with said source video; providing ROI position information associated with at least one video frame of said ROI video stream received by said client device, said ROI position information comprising at least one first position of said first sub-region within said image region; and/or, at least one look-ahead position associated with at least one video frame of said ROI video stream that is not yet received by said client device; using said ROI position information and tile position information for determining one or more tile video streams associated with one or more tile sub-regions, at least part of said one or more tile sub-regions overlapping with said first sub-region, said tile position information comprising the positions of said one or more tile sub-regions within said image region; and, requesting said one or more tile video streams In another aspect, the invention may relate to a video processor for forming a region-of-interest (ROI) stream, comprising ROI position information, wherein said processor may be configured for: relating an image region of a stream, preferably an MPEG and/or an DVB encoded stream, to a sub-region (a ROI) within an image region associated with source video; determining the position information, preferably coordinates, of said sub-region in said image region; and, inserting said position information in said stream.

In an embodiment, said position information may be inserted in the bit stream of said ROI stream to said client, preferably a SEI message signalled by a ROI coordinates flag indicating the presence of said ROI coordinates in said bit stream.

In an embodiment, at least part of said ROI position information is inserted in an MPEG transport stream, preferably as a packetized elementary stream in said MPEG transport stream or as a DVB-defined SAD (SynchronisedAuxilary Data) packet in said MPEG transport stream, optionally, said SAD packet comprising a time-shifted ROI coordinate.

In an embodiment at least part of said ROI position information may be inserted in a predefined box in an MPEG-4 stream, preferably in a moov, trak and/or stbl box of an MPEG-4 stream.

In an embodiment, at least part of said ROI position information may be inserted in a metadata track in a MPEG-4 stream, preferably using a dedicated sample entry code.

In an embodiment, at least part of said ROI position information is inserted as a watermark in said stream.

In yet another aspect, the invention may relate to a non-transitory computer-readable storage medium for storing video data, wherein said recording area may comprise: video data associated with a ROI stream, said video data for forming image regions that are sub-regions (ROIs) within an image region of a source video; and, position information, preferably coordinates, of said sub-regions in said image region.

In an embodiment at least part of said position information may be inserted in the bit stream of said ROI stream, preferably a SEI message signalled by a ROI coordinates flag indicating the presence of said ROI coordinates in said bit stream.

In an embodiment, at least part of said ROI position information may be inserted in an MPEG transport stream, preferably as a packetized elementary stream in said MPEG transport stream or, as a DVB-defined SAD (SynchronisedAuxilary Data) packet in said MPEG transport stream, optionally, said SAD packet comprising a time-shifted ROI coordinate;

In an embodiment, at least part of said ROI position information may be inserted in a predefined box in an MPEG-4 stream, preferably in a moov, trak and/or stbl box of an MPEG-4 stream.

In an embodiment, at least part of said ROI position information may be inserted in a metadata track in a MPEG-4 stream, preferably using a dedicated sample entry code. In an embodiment, at least part of said ROI position information may be inserted as a watermark in said stream.

In a further aspect, the invention may relate to anontransitory computer-readable storage media for storing a data structure, preferably a least part of a spatial manifest file for use by a client as described above, wherein said data structure may comprise:one or more tile representations of a source video, a tile representation comprising one or more tile identifiers for identifying said one or more tile streams, tile position information defining the position of a tile area (i.e subregion) within (of) the image region of the source video;a ROI stream identifier, preferably an URL, of a ROI stream that comprises ROI position information, said ROI stream comprising video data for forming image regions that are sub-regions of image regions of said source video; and, position information, preferably coordinates, of said subregion in said image region.

The invention may also be related to computer program product comprising software code portions configured for, when run in the memory of a computer, executing the method steps according to any of the above claims.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 8A and 8B depict a process for seamless switching between a non-tiled streaming mode and a tiled streaming mode according to an embodiment of the invention.

FIG. 10 depicts ROI data according to various embodiments of the invention.

FIG. 11 depicts an embodiment of the invention wherein ROI data are transported as an elementary stream in an MPEG transport stream.

DETAILED DESCRIPTION

Figure 1A:
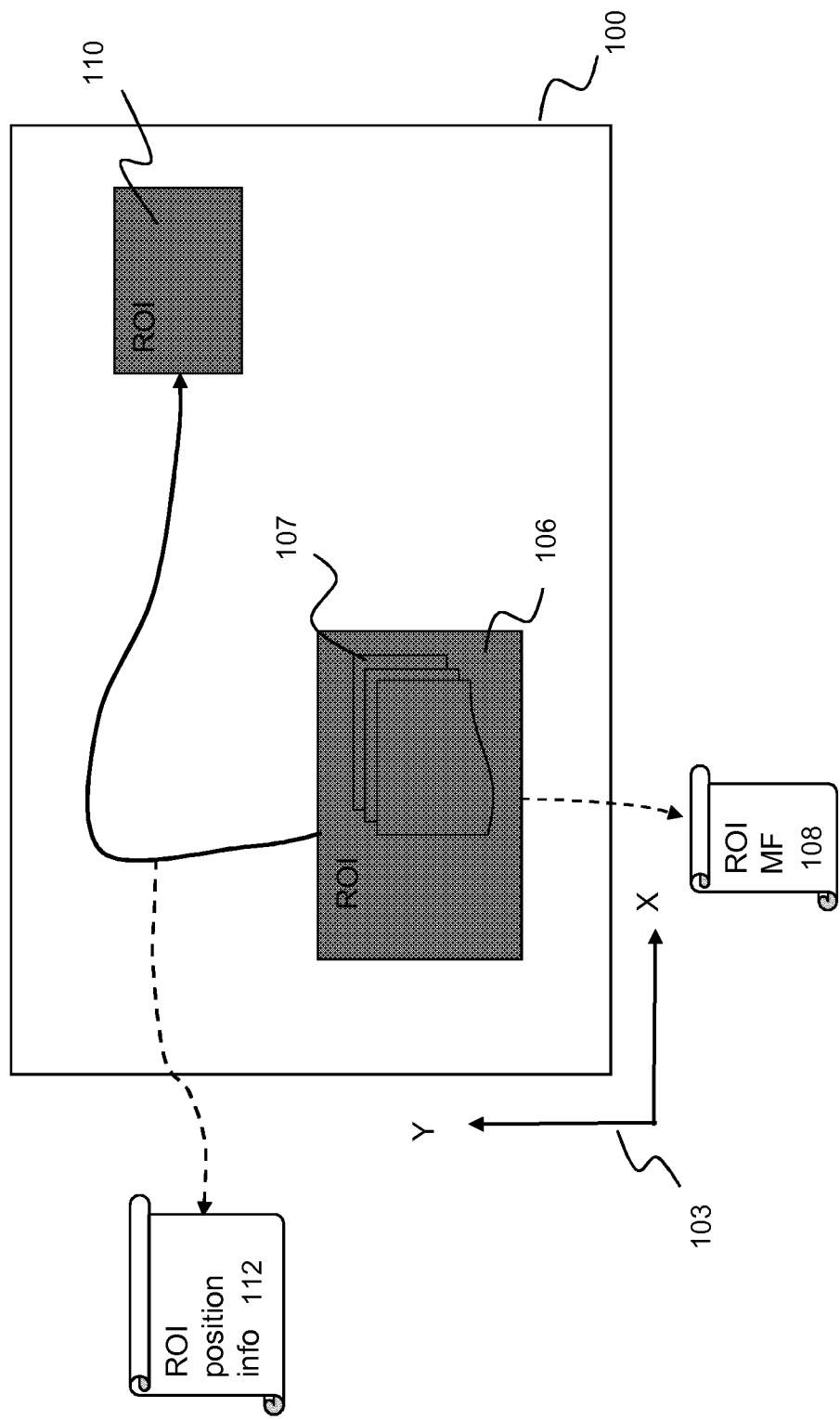
FIGS. 1A and 1B depict schematics of streaming a ROI to a client according to an embodiment of the invention.
Figure 1B:
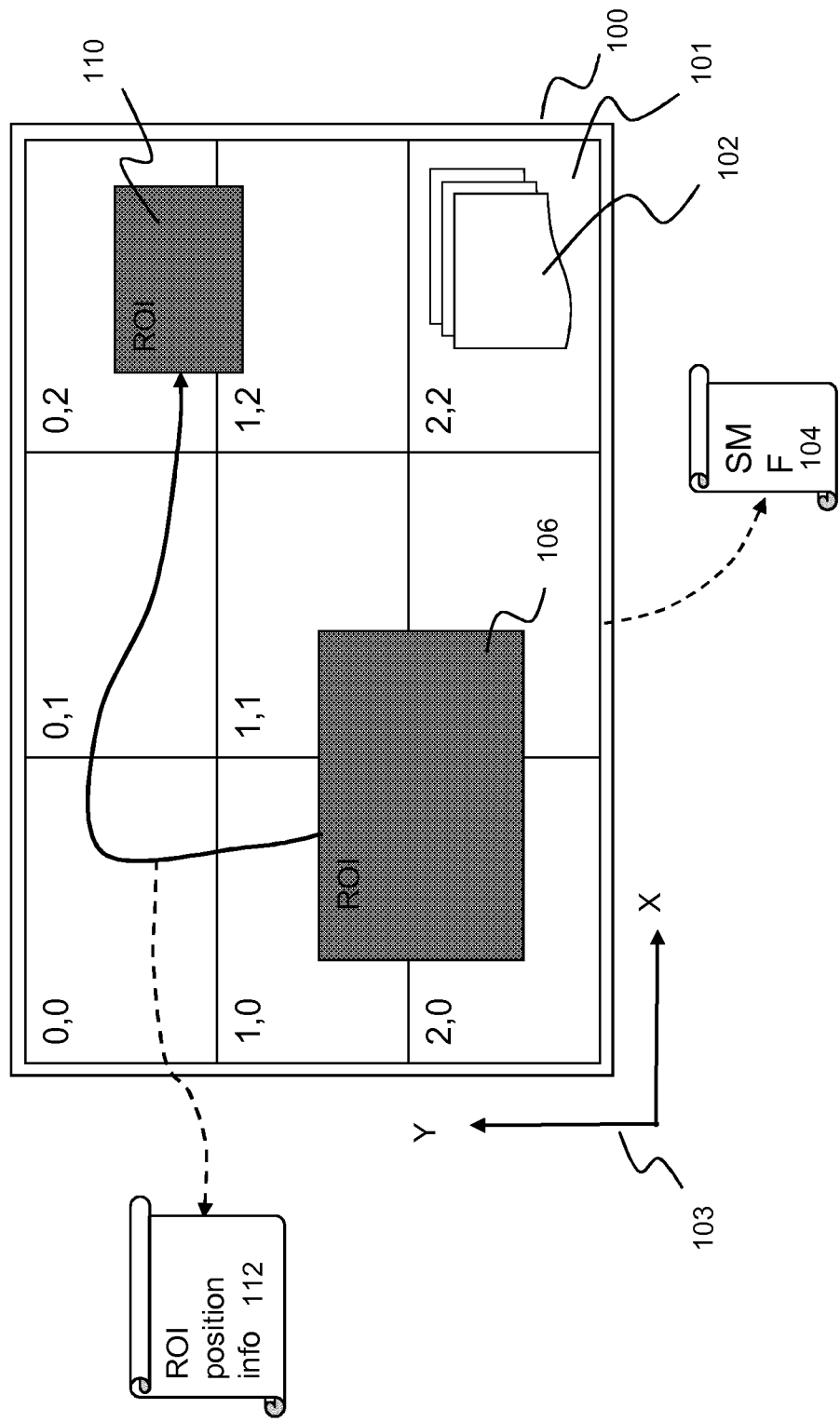

FIGS. 1A and 1B schematically depict the relation between the different streams that are used by the client devices described in this disclosure in order to render a so-called region-of-interest (ROI) on the display of user equipment on which the client device is implemented. In particular, FIG. 1A depicts a wide field-of-view (panoramic) image region 100 of a rendered source video. The source video may be formed on the basis of one or more high-resolution video files that have a widefield-of-view, different camera positions,different camera angles, 3D, etc.

On the basis of the source video, one or more streams may be generated that comprise a (pre-selected) first sub-region, representing a region-of-interest (ROI) 106,110, within the image region of the source video. The position and size of this first ROI may be associated with ROI coordinates. As shown in FIG. 1A, the ROI may follow a ROI trajectory wherein the first ROI is at a first time instance at a first position 106 within the image area and at a second time instance at a second position 110.

The (first) ROI may be pre-selected using a tracking algorithm or a camera operator. A stream may be generated by cropping the ROI out of the image region of decoded frames of the source video and encoding the cropped regions in a separate stream, e.g. an MPEG and/or DVB encoded stream. This stream may be referred to as a ROI stream 107. The coordinates of the cropped region may be referred to as ROI coordinates. For example, the source video may relate to a high-resolution, wide field-of-view video of a soccer match and the ROI stream may be generated on the basis of the source video by cropping the ROI associated with the ball out of the decoded frames of the source video.

Alternatively, the ROI (video) stream may be generated as a separate stream originating e.g. from a broadcast camera that follows the ball. In that case, an image processor may use an image recognition and tracking algorithm in order to correlate the (limited) field-of-view of the broadcast video with a particular sub-region (the ROI) of the wide field-of-view image region of the source video. This way, the image processor may relate so-called ROI coordinates to the frames in the ROI stream. In an embodiment, the ROI stream may be transmitted using a broadcast technology such as DVB.

In another embodiment, the ROI stream may be transmitted to the client on the basis of an adaptive streaming protocol such as HAS. A manifest file 108 may define the segments identifiers for locating one or more delivery nodes that are configured to deliver the segments to a client.

Examples of adaptive streaming protocols include Apple HTTP Live Streaming [http://tools.ietf.org/html/draft-pantos-http-live-streaming-07], Microsoft Smooth Streaming [http://www.iis.net/download/SmoothStreaming], Adobe HTTP Dynamic Streaming [http://www.adobe.com/products/httpdynamicstreaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6]. HTTP allows an efficient, firewall-friendly and scalable scheme for delivering tile streams (and segments) to clients.

In the above examples, ROI position information 112 may be determined when the ROI stream is formed. The ROI position information defines the positions of the (limited field-of-view) image sub-region of a ROI (video) stream within the wide field-of-view image region of the source video. The ROI position information may comprise ROI coordinates that define the position and the size of the ROI within the image region of the source video. In an embodiment, for each frame (or set of frames) in the ROI stream, ROI position information (ROI coordinates) may be generated. During the play out of the ROI stream, the ROI position may move within the full image area of the source video. During the play out of the ROI stream, the ROI coordinates may change in time thereby forming a stream of ROI coordinates. The stream of ROI coordinates may form a trajectory within the full image area of the source video.

In an embodiment, the ROI position information may comprise a stream of ROI coordinates that may be sent (in sync) with the ROI stream to a client. The ROI position information may be sent in a separate communication channel to the client. Alternatively, the ROI position information may be transported as part of the transport container of the video frames to the client. Examples will be described hereunder in more detail The trajectory of the (first) ROI in time within the image region of the source video is illustrated in FIG. 1A. The first sub-region (a ROI) may start at a first time instance at a first ROI position 106 associated with first ROI coordinates and a first ROI size and after some time, the ROI may be moved to a second ROI position 110 associated with second ROI coordinates and ROI size. During the trajectory, the ROI may zoom into a predetermined part of the image region of the source video.

Typically, user devices have limited rendering and bandwidth capabilities and thus are not capable of receiving and rendering the full image region of the source video in high-resolution quality. As shown in FIG. 1B, this problem may be solved by determining decoded frames of the source video using an image processor in order to process the video source into multiple tile (video) streams. The image processing may include decoding a frame of the source video into a displayable wide field-of-view image region and dividing the image region in tile areas 101 (tiles) of predetermined size. The tile areas form tile sub-regions of the full image region of the source file. In an embodiment, adjacent tile sub-regions may partly overlap. The position of tile sub-regions in the full image region may be defined on the basis a coordinate system frame 103 associated with the full image region. This coordinate system may also be used in order to determine the ROI coordinates of the ROI in the ROI stream as described in detail with reference to FIG. 1A. In case the image region relates to a 2D or 3D image region, a Cartesian coordinate system may be used. Alternatively, in case the image regions relates to a curved image region other non-Cartesian, curvilinear coordinate systems may be used, e.g. cylindrical, spherical or polar coordinate system.

For each frame of the source video, an image processor may generate multiple spatially adjoining tile sub-regions by cropping tile areas (i.e. adjacent sub-regions in the image region of the source video) out of a decoded frame. The tile sub-regions are subsequently formatted in tile frames and stored as a separate tile (video) stream 102 (file) on the basis of a known media streaming format.

This way, a source video may be divided in a set of tile streams, which may be individually stored, accessed and streamed to a client. The spatial relation between the tiles may hereafter referred to as the tile position information. Tile position information may comprise coordinates of tile sub-regions within the image region of said source video. This way, every tile stream may be related to a tile sub-region in the image area of the source vide. On the basis of the full set of tile sub-regions, the full image region of the source video may be reconstructed. Further, tile identifiers (file names and/or URLs) may be used for locating one or more delivery nodes (e.g. one or more media servers or a CDN) that are configured to store and deliver the tiles. The tile identifiers and the spatial tile information may be collected in a special data structure, which hereafter may be referred as a spatial manifest file (SMF) 104.

In an embodiment, a tile (video) stream may be configured for adaptive streaming using e.g. the HTTP-based Adaptive Streaming (HAS) protocol. In that case, the temporal sequence of tiles that build a tile stream may be temporally divided in tile segment streams or—in short—tile segments. The set of tile segments that defines a complete tile stream may also be defined in the SMF. Alternatively, the SMF may comprise a pointer to the HAS manifest file that defines the tile streams. A more detailed example of an SMF will be described hereunder with reference to FIG. 4.

The above-described tiling process for forming multiple tile streams on the basis of a source video may be repeated for different tile sizes and/or resolutions. This way multiple tile representations of the (same) source video may be realized. Hence, in this disclosure, tile representations of a source video may define different tiled variants of the source video, including: 2D and 3D formats, different video and/or audio qualities (e.g. SD/HD, bitrates, etc.), different resolutions, different field-of-views, camera angles, etc.

On the basis of the tile position information and the ROI position information that comprises ROI coordinates of the ROI stream, a client in a user device may request a predetermined set of adjoining tile streams that may be used by the client in order construct a second sub-region that comprises the first sub-region (the ROI). In particular, a set of synchronized spatially adjoining tile frames (i.e. a set of spatially adjoining tile frames that have the same playout time) may be used to reconstruct a second sub-region within the full image region that comprises the ROI of the ROI stream.

For example, as shown in FIG. 1B, at the first time instance, the ROI coordinates define a ROI 106 that overlaps with four tile sub-regions (i.e. sub-regions (1,0), (1,1), (2,0) and (2,1). These four tile regions may form a second sub-region within the image region that comprises the first sub-region (i.e. the ROI of a ROI stream) at the first time instance. Similarly, at the second time instance, the ROI coordinates may define a ROI 110 which overlaps with two tile sub-regions (i.e. sub-regions (0,2) and (1,2)). These two tile sub-regions may form a second sub-region within the image region that comprises the first sub-region (i.e. the ROI of a ROI stream) at the second time instance. This scheme may be used to smoothly switch from the ROI stream to tiled streaming.

As will be described hereunder in more detail, a user may interact with a displayed image region (e.g. the first ROI or the second ROI) using a user interface (e.g. a touch screen or a pointing device) and manipulate the displayed content (e.g. panning, zooming, tilting). In response to this user interaction, the interface may generate an instruction for the client device to start rendering the user-requested ROI on the basis of said one or more tile video streams. This way, a user may move or expand the ROI and—in response—the client may select the appropriate tile representation and request the appropriate tile streams of the selected tile representation. This mode of rendering a user-selected ROI may be referred to as the tiled streaming mode.

Hence, from the above it follows that a user may watch a certain scene, a soccer game, in a first mode (the ROI streaming mode) on the basis of a ROI (video) stream as described with reference to FIG. 1A, which may be transmitted to the client as an MPEG or DVB-encoded stream and a user may watch the same scene, details of the scene or the regions around the scene in a second mode (the tiled streaming mode) on the basis of tile streams as described with reference to FIG. 1B. As shown in FIGS. 1A and 1B, the transition from the ROI streaming mode to the tiled streaming mode is realized on the basis of ROI coordinates associated with the ROI stream.

The ROI stream may be used by the client in a default streaming mode, the (non-tiled) ROI streaming mode, wherein a broadcast or multicast stream is displayed to the user. The tile streams may be used by the client to render a ROI that may be manipulated by the user via a user interface of the user device. When a client is rendering a ROI stream on its display in the ROI streaming mode, the client will know the position of the ROI within the full image region of the source video on the basis of the ROI position information. The ROI position information associated with the ROI stream may be used by the client to smoothly or even seamlessly switch to the tiled streaming mode.

It is submitted that the spatial division of an image region of a source video in tiles is not limited to the example as depicted in FIG. 1. The image region may be spatially divided into a matrix of tile areas of equal dimensions of different dimensions. For example, in an embodiment, the image region may have a small tile area associated with the center of the original image frame and larger tile areas at the edges of an image region.

Figure 2:
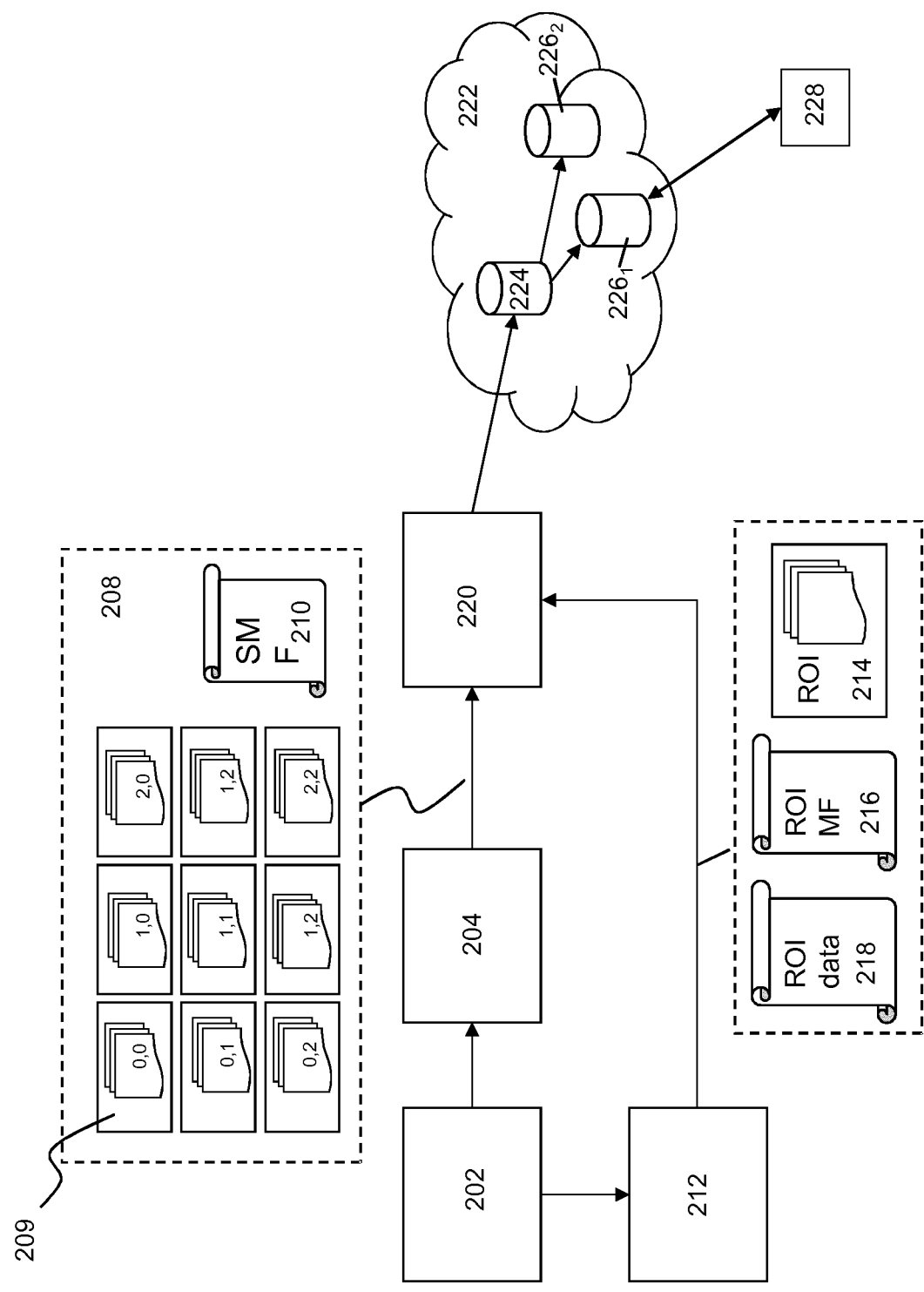
FIG. 2 depicts the process of generating tile streams and a ROI stream on the basis of source video file according to an embodiment of the invention.

FIG. 2 schematically depicts an exemplary process for generating spatially segmenting content. One or more high-resolution, wide field-of-view cameras 202 may be used to generate or compose a source video. A tiled video generator 204 may be used to generate tiled content 208 on the basis of the source video as described above with reference to FIG. 1. The tiled content may comprise one or more tile representations 209 of the source video wherein the spatial relation between the tile streams and, in some embodiments, the temporal relation of segments in a tile stream may be defined in a SMF 210.

Further, the source video may be delivered to a ROI stream generator 212. The ROI stream generator may be configured to select a ROI of particular interest (e.g. the ball in a soccer play) by panning and zooming through the image region of the frames of the source frames. The ROI may be selected automatically using an algorithm, e.g. a tracking algorithm for tracking a particular object in the images, or a human operator that selects the ROI. The coordinates of the ROI may be collected as ROI position information 218. If the ROI position information is collected in a separate file, the ROI position information may comprise information (e.g. a frame number) for linking ROI position information, e.g. ROI coordinates to a particular frame in the ROI file. Further, in an embodiment, the ROI stream may be configured as a (temporally) segmented stream for adaptive streaming.

Alternatively, the ROI (video) stream may comprise of the direct output of a broadcast camera, i.e. a broadcast stream, that captures part of the same scene as the source video as described with reference to FIG. 1. A combiner 220 may combine the ROI stream with the tiled content 208 before it sent to the network 222, in particular one or more delivery nodes $226_{1,2}$ in the network. In an embodiment, the combiner may insert a ROI stream identifier (e.g. its file name) in the SMF. In an embodiment, a delivery node may be a media server. In another embodiment, the delivery nodes (surrogate nodes) may be part of a dedicated content delivery network (CDN). In that case, the tile segments associated with the tile representations and one or more ROI segments may be ingested by a Content Delivery Network Control Function 224. The Content Delivery Network Control Function then distributes the tile streams and ROI streams on different delivery nodes so that efficient distribution of the streams is ensured. In an embodiment, the CDN may update the tile (and segment) identifiers (the URLs) such that a client may efficiently access delivery nodes of the CDN in order to request the delivery of (tiled) content.

When a client of a user device would like to access the ROI and/or tile streams, it may receive a SMF from a content provider or the CDN and use the manifest file to request and play out the ROI stream and/or the tile streams. The user device may generally relate to a (mobile) content play-out device such as an electronic tablet, a smart-phone, a notebook, a media player, a home gateway or DASH enabled devices such as a DASH-enabled HbbTV display device. Alternatively, the user device may be a set-top box or content storage device configured for processing and temporarily storing content for future consumption by a content play-out device, which has access to the stored content.

Figure 3:
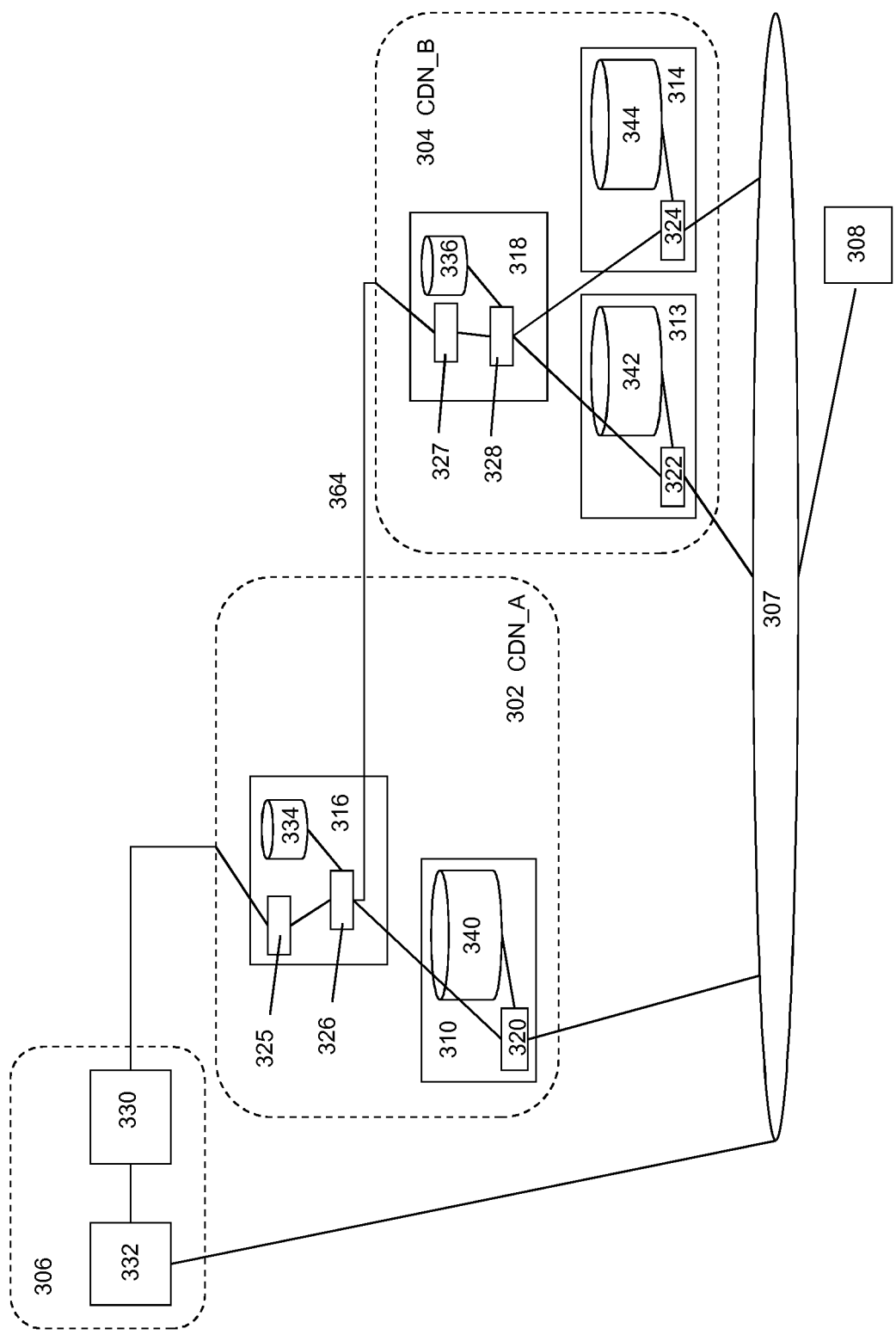
FIG. 3 depicts a content delivery system configured to stream tile streams and ROI streams to one or more clients according to an embodiment of the invention.

FIG. 3 depicts a system for streaming tiled content according to one embodiment of the invention. In particular, FIG. 3 illustrates a CDN-based content delivery system comprising a first CDN 302 (also referred to as the upstream CDN) interconnected via an CDN interconnect interface 364 to at least a second CDN 304 (also referred to as the downstream CDN). The content delivery system may further comprise a content source 306 connected via a transport network 307 to one or more terminals 308 hosting a client. The content source may be configured to generate and/or deliver ROI streams with associated ROI position information and one or more tile representations of a source video as described in detail with reference to FIGS. 1 and 2.

The CDN may comprise delivery nodes 310,313,314 and at least one central CDN node 316,318. Each delivery node may comprise or be associated with a controller 320,322,324 and a cache 340,342,344 for storing and buffering content. Each central CDN node may comprise or may be associated with an ingestion node (or content origin function, COF) 325,327 for controlling ingestion of content from an external content source, a content location database 334,336 for maintaining information about where content is stored within a CDN and a CDN control function (CDNCF) 326,328 for controlling the distribution of one or more copies of the content to the delivery nodes and for redirecting clients to appropriate delivery nodes (a process also known as request routing). The node hosting the CDNCF may be referred to as the request routing (RR) node. A customer may purchase content, e.g. video titles, from a content provider system 330 by sending a request to a web portal (WP) 332, which is configured to provide title references identifying purchasable content items. The CDNCF may manage the locations where tile streams and/or ROI streams may be retrieved using the content location database 334,336.

In the content delivery system of FIG. 3, the upstream CDN may outsource part of the delivery of segments to a client to the downstream CDN. For example, in one embodiment, low-quality segments may be located and delivered by a first CDN A (configured e.g. for delivery of content to mobile devices) and high quality segments may be located and delivered by a second CDN B (configured e.g. for delivery of high-quality segments to home media devices supporting HDTV technology).

Figure 4:
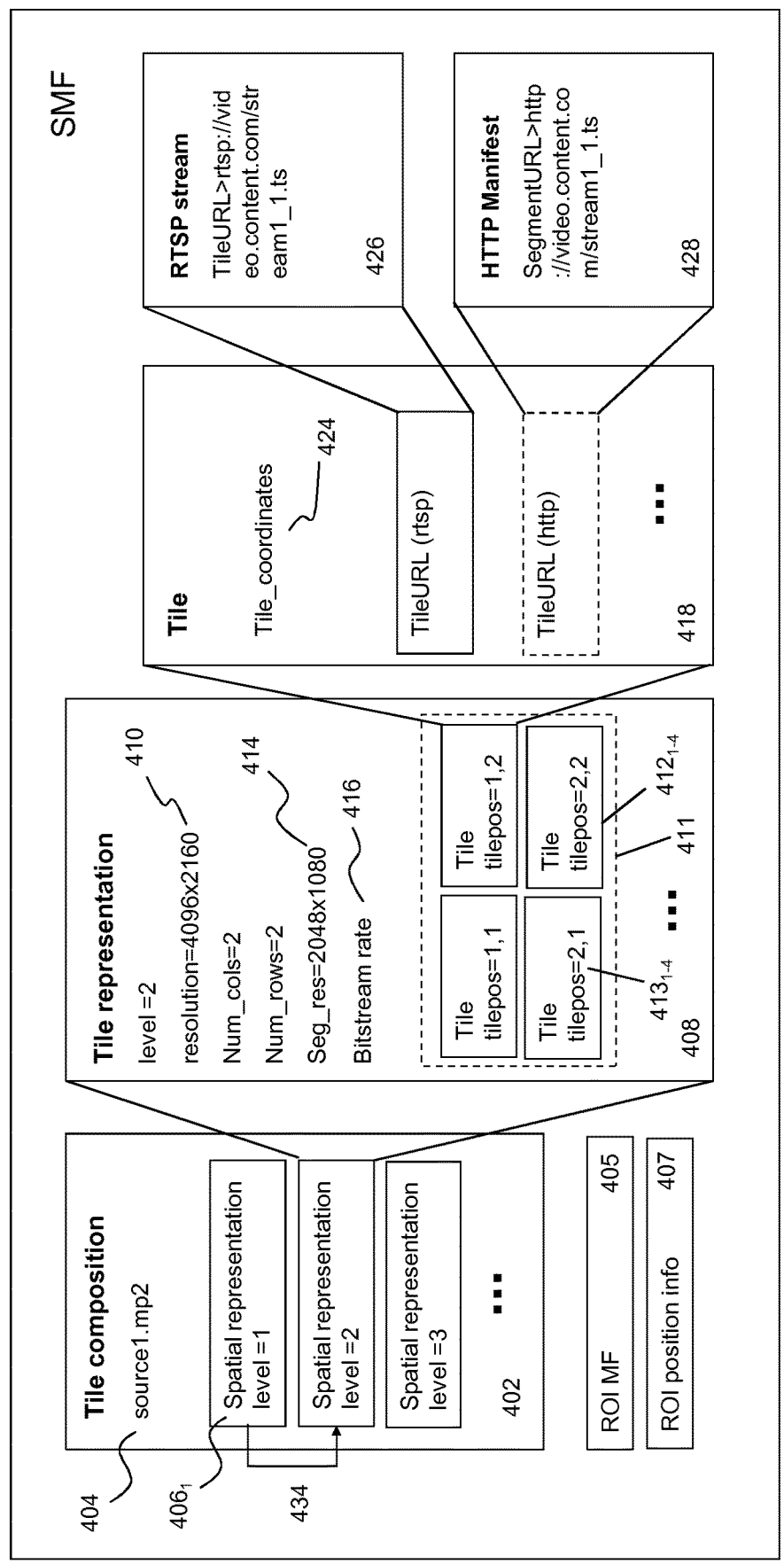
FIG. 4 depicts a schematic of a spatial manifest file according to an embodiment of the invention.

FIG. 4 schematically depicts a SMF data structure 400 according to one embodiment of the invention. An SMF may comprise several hierarchical data levels 402,408,418,428, wherein a first level 402 may relate to tile composition information defining one or more tile representations $406_{1-3}$ of a source video (e.g. source1.m2ts). Typically, the source video may be formed on the basis of one or more high-resolution and, often, wide field-of-view video streams or files.

The next data level 408 may define tile representations. The tile representation may comprise position information associated with the spatial relation between a set of tile streams. The tile representation may comprise a set of tile stream instances $412_{1-4}$ arranged in a spatial map 411. A tile instance may define a tile stream. In one embodiment, the map may define a matrix of tile stream instances.

A tile stream instance may be associated with tile position information $413_{1-4}$ defining the position of a tile area within the image region of the source video. For example, FIG. 4 depicts a matrix of tile stream instances, wherein the tile stream instances associated with tile positions (1,1) and (1,2) may be used by a client to display content. For example, on the basis these two tile video streams, video images may be constructed by a client that comprise content associated with the top half of the image region of frames in the source video.

The tile representation may further comprise information about a source resolution 410 indicating the resolution version of the source video, which is used to generate the spatial segment streams referred to in the spatial map. For example, in FIG. 4 the spatial segment streams referred to in the spatial map may be generated on the basis of a 4096× 2160 resolution version of the source video. The spatial representation may also comprise a segment resolution 414 (in the example of FIG. 4 a 2048×1080 resolution) defining the resolution of the tile streams referred to in the spatial map and a tile bit-stream rate 416 defining the bit rate at which tile streams in the spatial map are delivered to a client.

A next data level 418 may relate to tile information, i.e. information on the tile stream instances in the spatial map. Tile information may include position coordinates of tile frames in a tile stream 424. The position coordinates may be based on an absolute or a relative coordinate system. The position coordinates of the tile frames in the tile streams referred to in the spatial map may be used by the client to spatially align the borders of neighboring tiles frames into a seamless video image for display. This process is often referred to as "stitching".

Spatial tile information may further include one or more tile stream identifiers 426,428 (e.g. one or more URLs) for locating delivery nodes, which are configured to transmit the spatial tile stream defined by an identifier to the client. The tile information may also comprise protocol information, indicating which protocol (e.g. RTSP or HTTP) is used for controlling the delivery of the tile streams to the client.

In an embodiment, the SMF may further comprise a manifest file 405 (or a reference e.g. an URL to a MF of) one or more ROI streams, wherein said ROI stream is generated on the basis of the same source video as the tile streams. In another embodiment, the SMF may comprise ROI position information (or a reference e.g. an URL to a file or a stream comprising ROI position information, associated with the positions of the ROI in the ROI stream.

Figure 5:
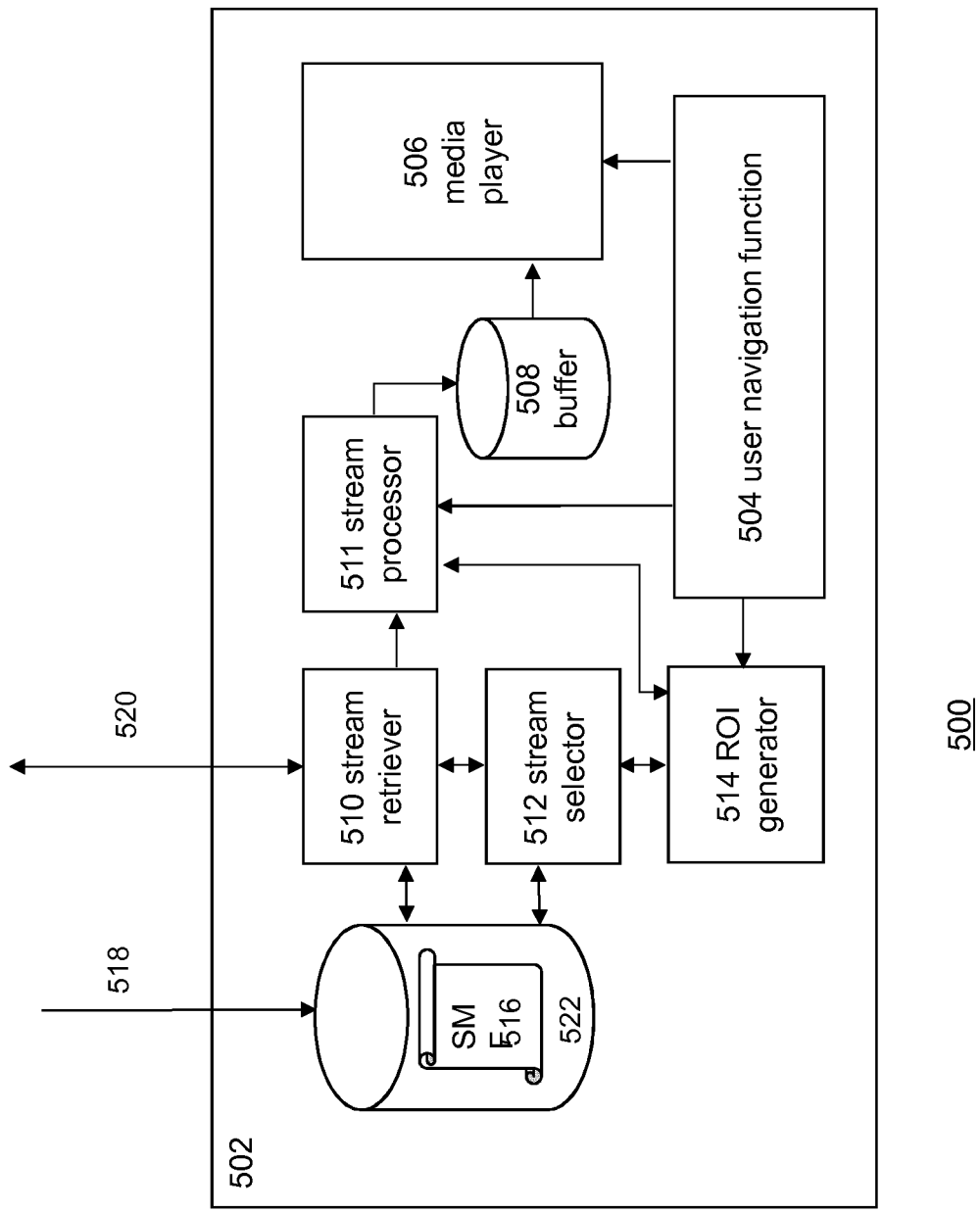
FIG. 5 depicts a client according to an embodiment of the invention.

FIG. 5 depicts a client device 502 according to one embodiment of the invention. In particular, FIG. 5 depicts a client device comprising a user navigation function 504 for interpreting user interaction with the (tiled) content that is processed by a media player 506. The user navigation function may be connected to a user interface that may include a touch-screen, a camera, keyboard, mouse, trackerball, joystick, microphone, buttons or any other man-machine interface that allows manipulation (e.g. panning, zooming and/or tilting) of the displayed content.

The client device may further comprise a manifest cache 522 for receiving (518) one or more manifest files from a content provider or a content source in the network (e.g. a media server or a CDN). The manifest files may include a SMF 516 defining tile steam identifiers (URLs) of a tile representation of a source video. Further, the SMF may comprise the tile position information comprising the position (coordinates) of the tile sub-regions of the tile video streams.

In some embodiments, the SMF may further comprise a MF of a ROI video stream that may be formatted on the basis of a HTTP-based adaptive streaming protocol. Alternatively, the MF of the ROI stream may be stored in the manifest cache separately from the SMF. In other embodiments, the ROI stream is an MPEG or DVB encoded broadcast or multicast stream in which the ROI coordinates are embedded. In that case, the client may be configured request (tune in or join) the broadcast stream or The manifest cache may be connected to a stream retriever 510 and a stream selector 512. The stream selector may select streams (one or more tile streams and/or ROI streams) and instruct the stream retriever to request the selected streams from the network 520 according to a certain scheme.

In the default situation of no user interaction, the content associated with the SMF may be streamed to the client on the basis of the ROI stream that comprises (or is associated) with ROI position information as described in detail with reference to FIGS. 1 and 2. Hence, in case the ROI video stream is HAS (HTTP-based adaptive streaming) stream, the stream selector may instruct the stream retriever to request segments of the (default) ROI stream. The segments of the ROI stream are not processed by the stream processor but are directly forwarded to the buffer 508 of the media player. Similarly, in case the ROI stream is a broadcast stream, the stream selector may join or tune into the required broadcast stream and the stream receiver may forward the packets directly to the buffer.

When the user navigation function is triggered by user interaction, the user navigation function may instruct the stream processor to extract the ROI position information from the ROI stream and forward the information to the ROI generator 514. The ROI generator may start generating ROI coordinates wherein the first coordinates may correspond to the ROI coordinates of one or more frames of the ROI stream that were processed by the client device the time instance user interaction was detected.

In another embodiment, the stream processor may always extract the ROI position information from the ROI stream and provide this information to the ROI generator. In that case, during the streaming and rendering of the ROI stream, the ROI coordinates of the rendered frames are always available to the client. In some embodiments, the ROI position information may be extracted from the ROI stream without decoding the frames. In other embodiments, the ROI position information may be extracted from the ROI stream after decoding the frames. In that case, the stream processor may be part of the media player that comprises a decoder for decoding the encoded frames.

The ROI generator may start calculating ROI coordinates on the basis of the user navigation output and the ROI coordinates of the ROI stream. In an embodiment, the user navigation function may interpret the user-interaction and generate a ROI vector that allows the ROI generator to calculate new ROI coordinates that correlate with a particular user interaction. For example, the user navigation function may interpret a one-finger sliding gesture into panning (translation) of the ROI and generate a translation (motion) vector for that ROI generator. In a similar way, a two-finger pinch gesture may be interpreted as a zooming action of the ROI, a button-hold as a freezing the ROI, and a spoken user command "full screen" as a zooming to full screen. The ROI generator keeps on calculating ROI coordinates when user input is received.

When the stream selector receives the calculated ROI coordinates from the ROI generator, it may use the tile position information in the SMF and the calculated ROI coordinates originating from the ROI generator in order to select a set of (e.g. one or more) adjacent tile (video) streams that may be used for forming a (second) sub-region within the image region. These tile streams may then be requested. After reception of the streams, the tile processor may synchronize the buffered tile frames and stitch synchronized adjacent tile frames together in order to form a stitched sub-region of the full image region. It is to be understood that when only one tile stream is selected, the stitching is of course not necessary. This (stitched) (image) sub region may then be cropped on the basis of the calculated ROI coordinates to form a second ROI. The cropped images may be buffered and rendered on a display (not shown).

Hence, from the above, it follows that a user interaction may switch the client from a (default) non-tiled ROI streaming mode wherein a predetermined ROI is displayed a tiled streaming mode wherein the ROI displayed to the user may be manipulated by via user interaction. When switching from the ROI streaming mode to the tiled streaming mode, the client may determine the ROI coordinates (for cropping) upon switching and uses these ROI coordinates in order to form substantially the same ROI or slightly shifted (in terms of position within the image region)in the tiled streaming mode so that a smooth transition during rending of the content is achieved.

In an embodiment, an external signal may switch the client from the non-tiled ROI streaming mode to the tiled streaming mode. For example, the ROI generator may be triggered to start calculating ROI coordinates on the basis of a signal in the ROI stream or another external signal.

When switching from the ROI streaming mode to the tile streaming mode, frames in the ROI stream and tile frames of selected tile streams are received by the client and synchronized on the basis of their common content play out timeline so that a smooth or even seamless transition between both modes is enabled.

Figures 6A, 6B:
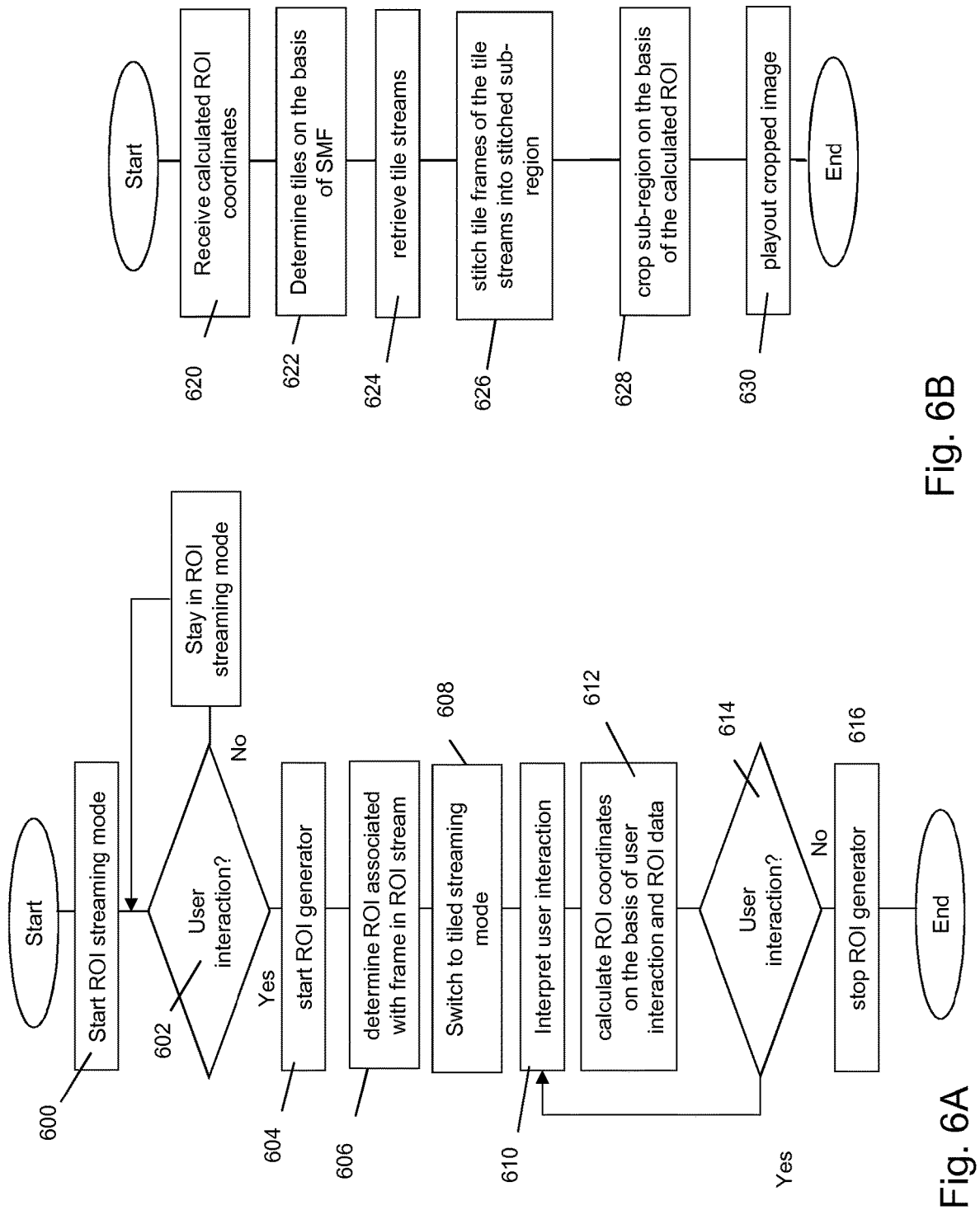
FIGS. 6A and 6B depict a schematic of a client process according to an embodiment of the invention.

FIGS. 6A and 6B depict a schematic of a client process according to an embodiment of the invention. In particular, FIG. 6A depicts a client process for controlling the generation of ROIs on the basis of information originating from the user navigation function. The process may start in the (default) ROI streaming mode (step 600). As long as no user interaction is detected, the client may continue the rendering of the (first) ROI on the basis of the ROI stream (the ROI streaming mode). If user-interaction is detected by the client(step 602), the ROI generator may be started (step 604) to calculate ROI coordinates for the stream selector and the stream processor (step 606). The first ROI coordinate determined by the ROI generator may correspond to the ROI coordinates of the one or more rendered frames in the ROI stream with which the user started interacting. These ROI coordinates may be forwarded to the stream selector (step 606) in order to switch to a tiled streaming mode (step 608; as described in more detail with reference to FIG. 6B).

The user navigation function may interpret the particular user interaction (step 610) and forward this information (as a ROI vector) to the ROI generator that continues receiving ROI position information associated with the ROI frames that are rendered by the client. The ROI generator may calculate the further ROI coordinates on the basis of the ROI position information of the ROI stream and the ROI vector (step 612) and forward the calculated ROI coordinates to the stream selector and the stream processor in order to render the ROI in the tiled streaming mode. This process may continue as long as user interaction is detected (step 614). When the ROI generator detects that there is no longer user activity (step 614), the ROI generator may stop the generation of ROI coordinates.

In particular, FIG. 6B depicts a client process for switching from rendering a ROI in the ROI streaming mode to rendering a ROI in the tiled streaming mode. The process may start by the stream selector receiving the calculated ROI coordinates from the ROI generator (step 620). The first ROI coordinates received by the stream selector may correspond to the ROI coordinates of the one or more rendered frames in the ROI video stream with which the user started interacting. The stream selector may use the tile position information and the ROI coordinates to determine the tile streams that comprise tile frames from which a sub-image region may be formed that includes the calculated ROI (step 622). The stream selector may instruct the stream retriever to request the selected tile streams from the network (step 624). When the client receives the requested tile video streams, it may synchronize these on the basis of their common content play out timeline and stitch tile frames of spatially adjoining tile streams together in order to form a stitched sub-region of the full image region of the source video (step 626). The stitched sub-region may be cropped on the basis of the calculated ROI coordinates (step 628). The cropped images may be buffered and rendered on a display (step 630). The above-described process ensures that when switching to the tiled streaming mode the last rendered ROI in the ROI streaming mode substantially matches the first rendered ROI in the tiled streaming mode. This way, the client is able to smoothly switch from rendering ROIs in the ROI streaming mode to rendering ROIs in the tiled streaming mode.

Figure 7A:
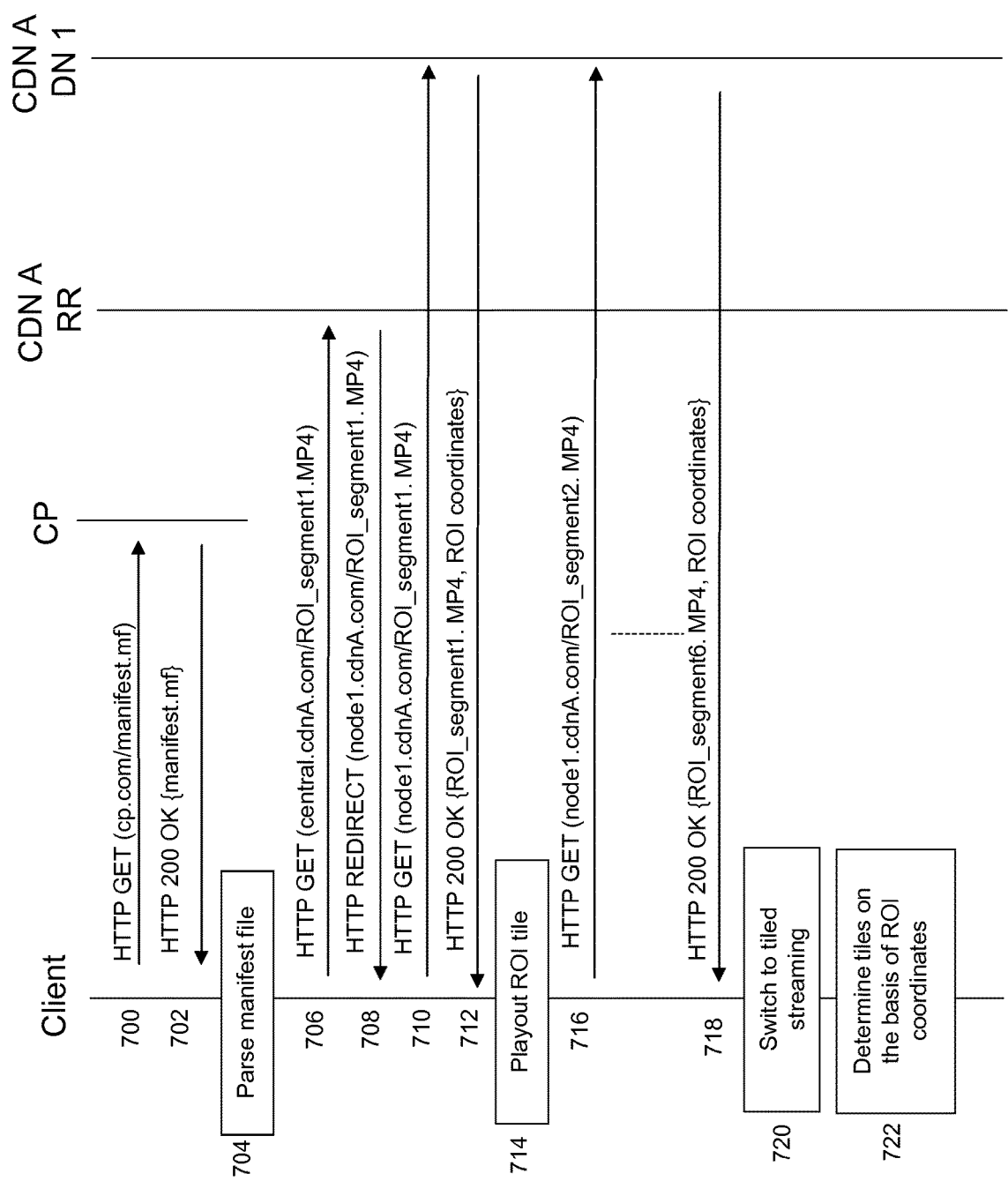
FIGS. 7A and 7B depict a streaming process according to an embodiment of the invention.
Figure 7B:
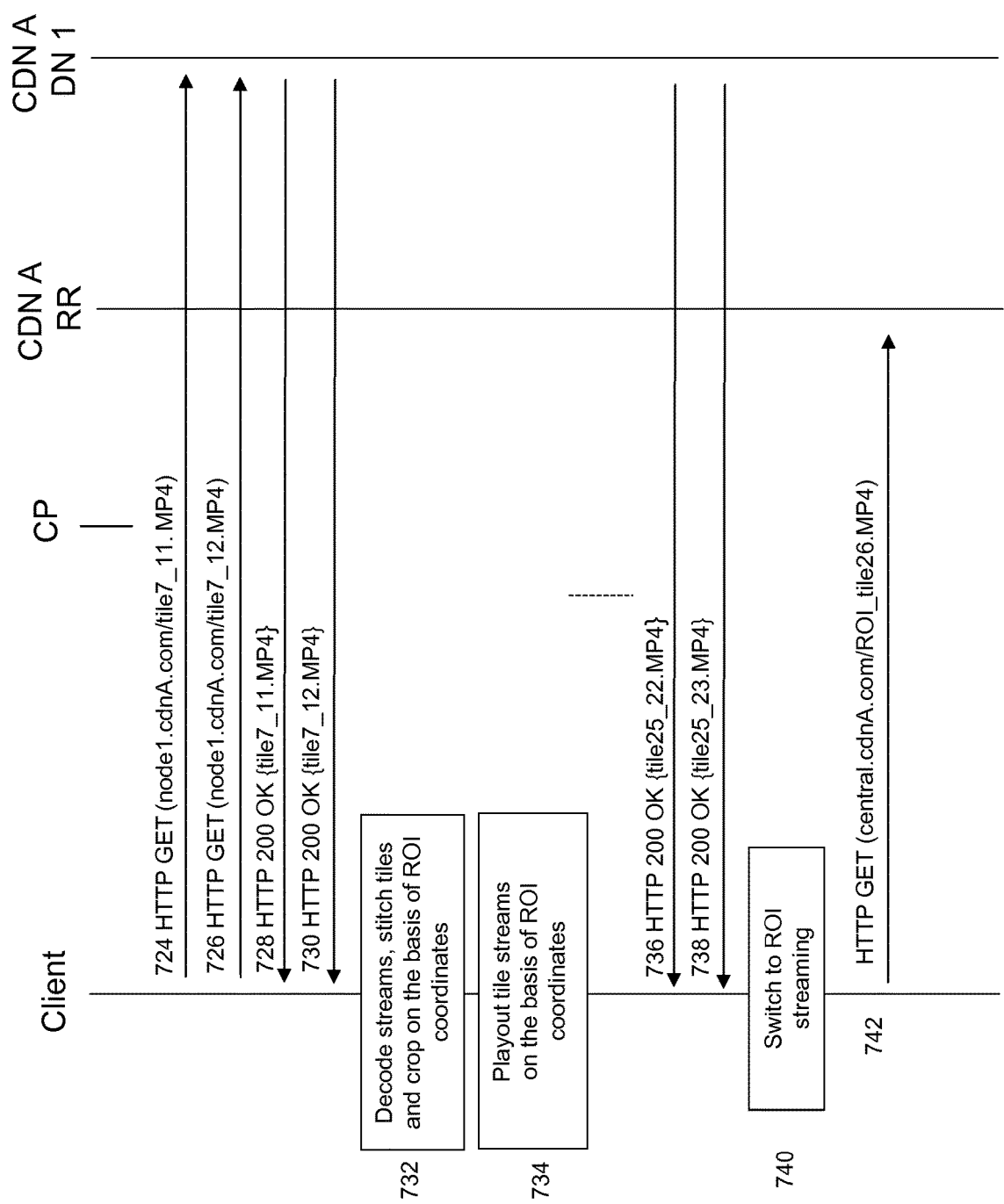

FIGS. 7A and 7B depict a ROI streaming process according to an embodiment of the invention. In this particular example, the tile streams may be distributed by a CDN to clients using an adaptive streaming protocol such as the HTTP adaptive streaming protocol. The process may start with a client requesting and receiving a spatial manifest file SMF from a content provider CP (steps 700 and 702). The client may parse the SMF (step 704) and start the streaming process in the ROI streaming mode. To that end, the client may select the first (ROI) segment of the ROI stream from the SMF and send a request message (step 706), an HTTP GET message, to the request routing RR node of the CDN. The request routing node may locate the delivery node on which the requested ROI segments are stored and send the URL of the localized delivery node in a redirect message back to the client (step 708). The client may use the URL in for requesting the ROI segments identified in the SMF.

Hence, after the redirect message, the client may send a request message back to the deliver node that comprises the requested ROI segment (step 710). The delivery node may send the requested first ROI segment back to the client (step 712). In this particular example, the ROI segment may comprise the ROI coordinates of the ROI in the ROI stream. The ROI coordinates may define a trajectory within the spatial representation of a source video. Different ways of transporting the ROI coordinates within a stream are described hereunder in more detail. The first ROI segment may be buffered and played-out by the client (step 714) while the retrieval process for the further segments may be continued.

After a certain time, e.g. during the play out of the sixth ROI segment (steps 716-718), the client may be triggered to switch to the tiled streaming mode (step 720). For example, the client may detect a user interaction that is interpreted by the user navigation function as a panning action. Upon the trigger to switch to the tiled streaming mode, the client may determine first ROI coordinates associated with the one or more frames that were rendered during the detected user interaction (step 722). Thereafter, the client may continue determining further ROI coordinates on the basis of the ROI position information of the ROI stream in a similar way as described with reference to FIGS. 5 and 6A and 6B above.

In an embodiment, the client may use the first ROI coordinates and the tile position information in the SMF in order to determine a set of spatially adjoining tile streams that may be used to form an image region that comprises the ROI. In this example, the tile streams may be segmented into tile segments so that a HAS streaming protocol may be used to deliver the tile segments to the client. Thereafter, the client may start requesting the tile segments of the selected tile streams on the basis of the SMF. In particular, the client may send request messages comprising the URLs of the selected tile segments (in this case the seventh segment of the selected tile streams tile7_11 and tile7_12) of the selected tile streams (steps 724-726), and—in response—receive response messages from the delivery node comprising the requested tile segments (steps 728-730).

During the above-described process of determining and requesting the tile streams, the client continuous the play out of the ROI segments (not shown).

Upon reception of the requested tile (video) streams, the client may synchronize these tile streams and the rendered ROI stream on the basis of their common content play out timeline. Synchronized tile frames of adjoining tile streams (i.e. tile frames that are associated with a particular common play out time) may be decoded and stitched together into an image region that comprises the ROI (step 732). If needed, ROI coordinates may be used to crop the stitched (image) sub region into an image region (a second ROI) that is substantially similar (e.g. the same or slightly shifted) to the ROI of the ROI stream that was played-out when the client received the requested tile streams.

When the formation of the stitched image sub regions is in sync with the play out of the frames in the ROI stream, the client may switch from the rendering of the first ROI on the basis of the ROI video stream to rendering of a user-generated (second) ROI on the basis of the tile (video) streams (step 734). In the tiled streaming mode the client may continue to request tile segments, stitch tile frames associated with a common play out time into an image sub region and (optionally) crop the image sub region before rendering it on a display as a second ROI.

After a certain time, e.g. after the play out of a stitched and cropped image region that was generated on the basis of tile segments 25 (steps 736 and 738), the user may interact with the user device in order to switch back to the default ROI streaming mode (step 740). In this mode, the rendering of the content may be continued on the basis of the 26$^{th}$ ROI segment (step 742).

FIGS. 8A and 8B depict a process for seamless switching between a non-tiled streaming mode and a tiled streaming mode according to an embodiment of the invention.

As shown in FIGS. 7A and 7B the tile (video) streams that selected for starting the tiled streaming mode are determined on the basis of ROI position information that is associated with one or more ROI frames of the ROI stream at a time T at which the client receives a trigger for switching to the tiled mode (e.g. by a user interaction).

This embodiment may be used for ROI streams or particular parts of a ROI stream where the ROI trajectory will not be outside an image region that may be formed by adjoining tile streams that are selected by the client at the time a signal for switching to the tiled streaming mode is received.

FIG. 8A depicts a situation wherein a client receives a signal to switch from the ROI streaming mode to the tiled streaming mode at time T. At that time, the client is rendering frame f of the ROI (video) stream. The ROI position information associated with frame f may comprise the ROI coordinates frame f (pos0 in FIG. 8A). These ROI coordinates are used to retrieve a set (one or more) of spatially adjoining tile (video) streams, each comprising at least one frame. These frames, upon being synchronized, may be used to form (stitch) an image sub region that comprises the (second) ROI of frame f.

During a time period Δt that is needed to retrieve the selected tile streams, a number of n ROI frames may be rendered by the client wherein n=Δt*R and wherein R is the (average) frame transmission rate that is used by a delivery node to transmit the ROI stream to a client. At time T+n the client will receive the requested adjoining tile streams, synchronize the tile frames with the ROI frames of the ROI stream, decode the synchronized tile frames and stitch them together to form a stitched image sub-region. If necessary, the client may use the ROI coordinate of the ROI in the ROI stream at time T+n in order to crop the stitched image sub region into an image (second ROI) that substantially matches the first ROI of the ROI (video stream) frame at T+n. Thereafter, the client may switch from the rendering of the first ROI on the basis of the ROI (video)stream to the rendering of the second ROI on the basis of the cropped image (second sub-region) so that a smooth transition to the tiled streaming mode is realized.

FIG. 8B depicts a process flow of the steps for achieving a smooth transition to the tiled streaming mode as illustrated in FIG. 8A. First, the client may receive a signal to switch to the tiled streaming mode (step 802). Then ROI coordinates associated with frame f are provided to the client (step 804). The client may use the ROI coordinates and the tile position information in the SMF (step 806) in order to determine a set (one or more) of adjoining tiles streams that may be used to form a stitched image sub-region that comprises (or substantially overlaps with) the first ROI of the ROI (video) stream at a later point in time (step 808), i.e. at the time T+n the selected tile streams are received by the client.

The selected tile (video) streams may be retrieved (step 810) and are received by the client at a time T+n. Thereafter, the tile frames of the adjoining tile streams and the ROI frames of the rendered ROI stream may be synchronized. Tile frames f+n of spatially adjoining tile streams that have the same position on the content presentation timeline may be decoded (step 812) and stitched together in order to form an (second) image sub region comprising (or substantially overlapping with) the first ROI of frame f+n of the ROI (video) stream (step 814). Then, the ROI coordinates associated with ROI frame f+n may be used to crop the second ROI out of the (second) image sub region (step 816). Thereafter, the display of the content may be switched from rendering ROI (image) frames of the ROI (video) stream to rendering the cropped (second) image sub regions derived from the one or more tile video streams (step 818). This way, a smooth transition from a ROI streaming mode to a tiled streaming.

If for any particular reason, the displayed area is not available because tiles are not yet received and/or because the ROI is (partly) outside the image region defined by the requested adjoining tile streams, a fall-back mechanism may be implemented. In an embodiment, a low-resolution video stream of the source content may be streamed to the client as a background process during the whole streaming process. When certain content is not available, the low-resolution video may be used to temporarily crop the missing content and render it while the missing tile streams are retrieved. This way a smooth transition to the tiled stream mode may be achieved even though the high-quality video may be rendered somewhat later.

Figures 9A, 9B:
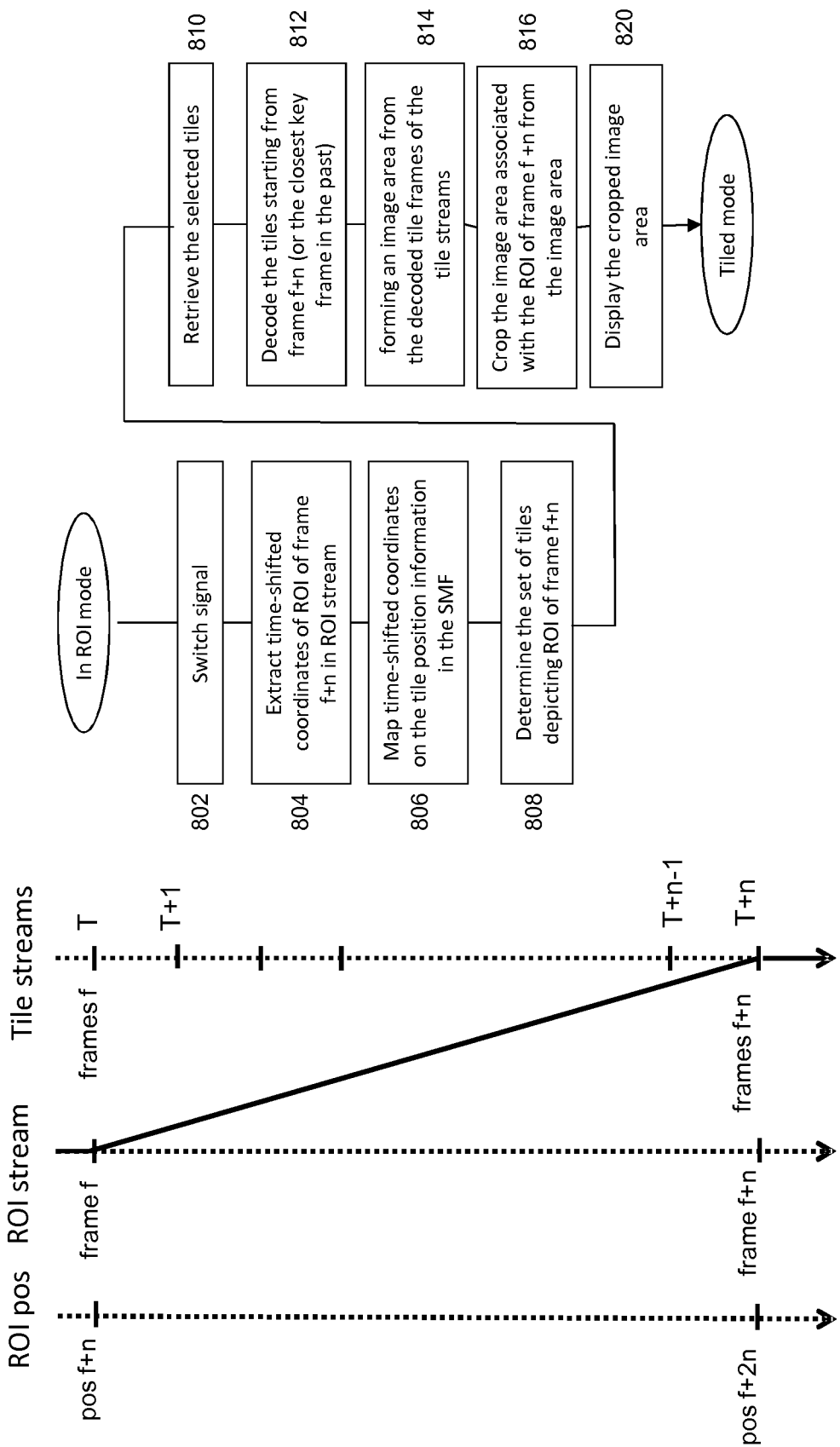
FIGS. 9A and 9B depict a process for seamless switching between a non-tiled streaming mode and a tiled streaming mode according to another embodiment of the invention.

FIGS. 9A and 9B depict a process for seamless switching between a ROI streaming mode and a tiled streaming mode according to another embodiment of the invention. In some situations, the time Δt for retrieving the tile segments may be of the order of several seconds (especially when the data are delivered over a best-effort network). Furthermore in some situations, the trajectory of the ROI in the ROI stream may be very dynamic, e.g. it may comprise large translations and/or zooming actions within the image area of the source file with a short time period. Hence, during the retrieval time of the tile segments the trajectory of the ROI may have shifted outside the (second) image sub region of the set of tile (video) streams that were originally selected at time T so that a smooth transition of the rendering in the ROI streaming mode to the tiled streaming mode will be hindered.

In order to deal with this problem, the ROI position information may comprise look-ahead position associated with video frames of the ROI video stream that are not yet received by said client. In an embodiment, the look-ahead position may comprise one or more time-shifted first ROI coordinates of one or more image frames in said ROI video stream that are not yet received by said client device. The time-shifted ROI coordinates being provided to the client device prior to the reception of the associated image frames. In a further embodiment, said time-shifted ROI coordinates may be associated with time-shift information, preferably a time stamp, for determining said time-shift. In this embodiment, ROI position information is time-shifted so that a client device may receive ROI position information ahead in time. This way the client may request the correct tile streams even when the ROI follows a very dynamic trajectory in time within the image region of the source video.

In FIGS. 9A and 9B, the ROI coordinates in the ROI position information may be provided to the client ahead of time with respect to the associated frames in the ROI stream. In an embodiment, the ROI position information may be time-shifted over a time period (expressed in a number of frames) n=Δt*R wherein R is the (average) frame transmission rate that is used by a delivery node to transmit the ROI (video) stream to a client. The time-shifted ROI position information may be prepared by the CDN or another entity in the network and Δt may be the maximum time period for a CDN to deliver a segment to a client.

The time-shift Δt may be determined on the basis of the characteristic delivery times of the network. For example, in a best effort network Δt may be relatively large, e.g. a few seconds or more, and in a network were data is delivered according to certain QoS rules Δt may be smaller, e.g. less than a few seconds or even less than one second.

The above-described process is schematically depicted in FIG. 9A wherein a client receives a signal to switch from the ROI streaming mode to the tiled streaming mode at time T. At that time, the client is rendering frame f of the ROI stream. The ROI position information associated with frame f may be ROI coordinates that are shifted ahead in time. In particular, the ROI position information for frame f may comprise ROI coordinates of a future ROI frame f+n (wherein n=Δt*R), yet to be rendered. The client may determine the set of tile (video) streams on the basis of the time-shifted ROI coordinates and the tile position information in the SMF.

After a period Δt (n frames) the first tile frames of the selected tile (video) streams will arrive at the client at time T+n. The client may synchronize tile (video) streams and the rendered ROI stream on the basis of their common content play out timeline. Synchronized tile frames of adjoining tile streams (tile frames that are associated with a particular common play out time) may be decoded and stitched together into an (second) image sub-region that comprises (or substantially overlaps with) the (first) ROI provided by the ROI video stream. The client may then form a stitched image sub region that comprises (or substantially overlaps with) said (first) ROI and use the time-shifted ROI coordinate posf+n in order to crop an image that corresponds to (or is only slightly shifted compared to) the ROI of frame f+n provided by the ROI video stream. This way, a smooth transition to the tiled streaming mode is ensured even when the ROI is moving during the retrieval of the retrieval of the tile streams.

FIG. 9B depicts a process flow of the steps for achieving a smooth transition to the tiled streaming mode as illustrate in FIG. 9A. First, the client may receive a signal to switch to the tiled streaming mode (step 902). Then time-shifted ROI coordinates associated with frame f+n are provided to the client (step 904). The client may use the time-shifted ROI coordinates and the tile position information in the SMF (step 906) in order to determine a set of adjoining tiles streams that can be used to form a stitched image region that comprises the ROI of frame f+n of the ROI stream (step 908). The selected tile streams may be retrieved (step 910) and are received by the client at a time T+n. Thereafter, the tile frames of the adjoining tile streams and the ROI frames of the rendered ROI stream may be synchronized. Tile frames f+n of spatially adjoining tile streams that have the same position on the content presentation timeline may be decoded (step 912) and stitched together in order to form an image region comprising the ROI of frame f+n of the ROI stream (step 914). The time-shifted ROI coordinates (posf+n) may be used to crop the (second) ROI out of the image sub region (step 916) formed by the synchronized frames of the tile video streams, and the display of the content may be switched from rendering ROI frames in the ROI stream (e.g. the first ROI) to rendering the cropped image regions (e.g. the second ROI) of the tile streams (step 918). This way, a smooth transition from a ROI streaming mode to a tiled streaming mode can be made even if the played-out content comprises a highly dynamic ROI trajectory.

It is submitted that FIGS. 9A and 9B provides just one embodiment of use of look-ahead position information and other implementations are also possible. For example, in an embodiment, the look-ahead position may be generated by an algorithm that that predicts the trajectory of the ROI within the image region of the source video using e.g. a known extrapolation algorithm that uses the ROI position information that is available in the buffer of the client device.

FIG. 10 depicts ROI position information according to various embodiments of the invention. FIG. 10A depicts an example of ROI position information encoded in XML that describes a particular region of interest. The ROI position information in FIG. 10A depicts three consecutive ROIs tags.

A ROI tag may comprise information for correlating the ROI tag to a ROI frame in the ROI stream. For example, in FIG. 10A the <AbsoluteTime> tag may comprise a timestamp or another (unique) value that may be used to identify a frame in a stream. The time stamp may define an absolute time that is associated with the ROI. In an embodiment, the time stamp may comprise the wall-clock time defining the recording time of the ROI frame it is associated with. The absolute time may be encoded as the number of seconds since 1-1-1970 in floating point notation (e.g. Unix epoch time). When using timestamps, the timestamps should also be embedded in the video frame(s) so that the frames may be correlated to the correct ROI position information (ROI tag).

Further, a ROI tag may comprise position information of the ROI. For example, the <PixelX1X2Y1Y2> tag may describe the position of the ROI in terms of pixel units. The top-left pixel of a screen may correspond to (X,Y)=(0,0). This way X1 defines the left side of ROI; X2 defines the right side of ROI; Y1 defines the topside of ROI; and, Y2 defines the bottom side of ROI. In such scheme for a full HD 1920×1080 screen, the lower-right pixel corresponds to (X,Y)=(1919,1079).

The first ROI in the example may define the full screen. The second ROI in the example may represent zooming to the centre by 80%. The third ROI in the example may represent a translation of 20 pixels to the right FIG. 10B depicts another embodiment of ROI position information encoded in XML. The ROI tag may comprise a <RelativeTime> tag that describes the relative time that applies to the ROI. The relative time may be counted from the starting point of the video content and may be encoded as seconds in floating point notation. The relative time may be used as correlation information in order to relate a ROI tag to a ROI frame. When using a relative time, a clearly defined starting point of the ROI stream should be defined.

Further, the ROI tag may comprise a <NormalizedXYzoom> tag that describes the location of the ROI, described a in normalized format (X,Y,zoom). Here the coordinates "X,Y" may indicate the position of the top-left pixel of the ROI in floating point notation wherein X and Y are both in the range 0-1. In this example, the top-left pixel of a screen corresponds to (X,Y)=(0,0) and the lower right of the full screen to (X,Y)=(1,1). The parameter "zoom" may define the zoom level, which may also be in floating point notation. Zoom=1 may correspond to the full screen.

The first ROI tag of FIG. 10B may represent the full screen. The second ROI may represent zooming to the top left by 50%. The third ROI in the example may represent a move of the top left of the ROI to the centre of the screen FIG. 10C depicts examples of tags that may be used in a ROI tag. The FrameNumber tag may be used as correlation information if frame numbers can be derived from the content. The Pixel XYWH tag may define X,Y coordinates plus width and height of the ROI expressed in pixel units. The RadialNormalized XYR tag may define X,Y coordinates of a circular ROI and its radius. In an embodiment, the X,Y coordinates may be normalized to a 0-1 scale. The SpeedPixel dXdYdWdH tag may define a time derivative of X,Y, width and height of the ROI, expressed in pixels-per-second.

FIG. 11 depicts an embodiment wherein ROI position information is transported as an elementary stream in an MPEG transport stream (MPEG TS). In particular, the ROI coordinates of the ROI stream may be packaged in a separate PES (Packetized Elementary Stream) with a Private Data Stream ID. This PES stream, which may be referred to as a ROI coordinate stream,may then be multiplexed in the MPEG Transport Stream that also comprises the ROI stream.

FIG. 11 depicts an XML representation of a PMT that includes a video stream (Type=0x2, PID=0x1B63), an audio stream (Type=0x3, PID=0x1B64) and a ROI Coordinate stream (new Type=0x20, PID=0x1B66). The new Stream Type may indicate a PES stream containing ROI coordinate information. This Stream Type can then be used in a PMT (Program Map Table) table to indicate the PID containing the ROI coordinate stream.

On the client side, the synchronization between the video and the ROI coordinates may be realized through the use of PTS timestamps, which are common to all PES packets belonging to a particular program (and described by a single PMT). As an example, if the client needs to check the ROI coordinate of the ROI stream at a certain moment in time, it may check the PTS value of the currently displayed video frame. Thereafter, it may search in the PES that comprises the ROI coordinates (the ROI coordinate stream) for the packet with the same PTS. Within this packet, it will find the ROI coordinate information for that particular video frame.

In a further embodiment (that may also be used with MPEG Transport Streams) instead of defining a new Stream Type, the ROI Coordinate data may be transported using the DVB-defined SAD (SynchronisedAuxilary Data) structure (see TS 102 823). In that case, the PMT table advertises the 0x06 Stream Type to indicate a private data PES stream. To indicate that the particular SAD comprises ROI Coordinates, a new Auxilary Data Descriptor may be defined (see section 5.1 of TS 102 823).

Apart from using the SAD structure to carry and indicate a ROI Coordinate stream instead of defining a new PES Stream Type, all other aspects of this embodiment are similar to those described for the embodiment as described with reference to FIG. 11. Since SAD packets also contain PTS values, these can be used to provide synchronization between the ROI Coordinate stream and the ROI stream.

In yet a further embodiment, in order to transport time-shifted ROI coordinates, the SAD packet not only comprises the ROI Coordinate data but also the timestamp to which the coordinate relates. Such a timestamp can be in the form of a frame number, content timestamp or PTS/DTS value. In the latter case, the PTS value in the packet header is used by the TS multiplexer to position the packet in the TS stream, while the PTS packet, which is included in the payload, is used to correlate the coordinate to a particular video frame.

Figures 12A, 12B:
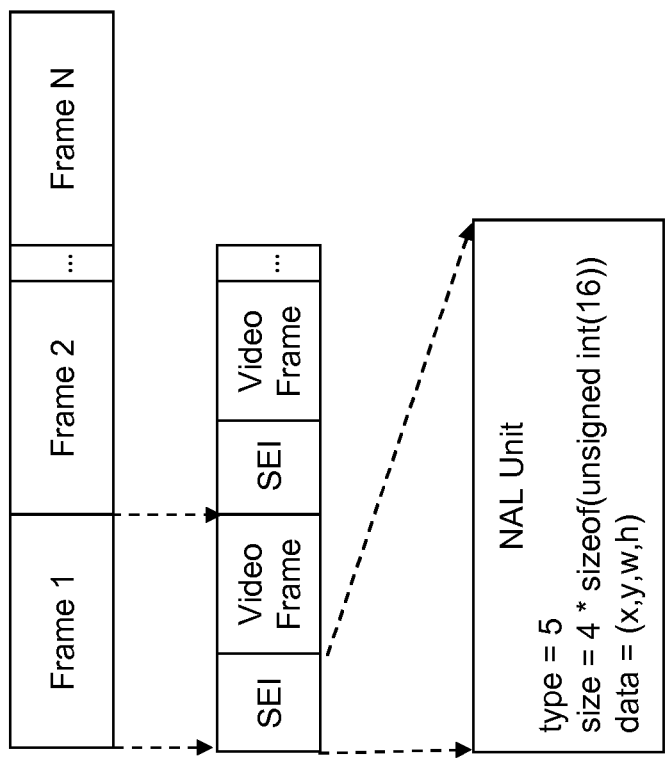
FIGS. 12A and 12B depict embodiments of the invention wherein ROI data are transported in the encoded bit stream of MPEG stream.

FIGS. 12A and 12B depict an embodiment of the invention wherein ROI data are transported in the bit stream of an MPEG stream. In particular, FIG. 12A depicts an embodiment wherein the ROI data are inserted as a supplemental enhancement information (SEI) message in the bit stream of a MPEG stream that is encoded using an H.264/MPEG-4 based codec.

In this scheme, a NAL Unit may define an elementary block in the bit stream. A SEI message is defined as a NAL Unit associated with supplemental enhancement information (SEI) (see 7.4.1 NAL Units semantics in ISO/IEC 14496-10 AVC). Here the SEI message is defined as a type 5 message: user data unregistered. The SEI message may comprise a predetermined number of integers (in this example four integers) for the parameters of the ROI data.

SEI messages may carry extra information in order to assist the process of decoding. Nevertheless their existence is not mandatory in order to construct the decoded signal so that conforming decoders are not required to take this extra information into consideration. The definition of the various SEI message and their semantics is defined in D.2 of ISO/IEC 14496-10:2012.

The SEI message type referred to as user data unregistered allows arbitrary data to be carried in the bit stream. In case of ROI coordinates this SEI message may be used to carry the ROI coordinates. Four parameters, i.e. horizontal position and vertical position of the top left corner and the width and the height may be used to define a ROI in the image region of decoded frames of the source video.

FIG. 12B depicts another embodiment of the invention wherein ROI data are transported in the coded bit stream. A Boolean flag in the frame header may indicate whether such information is present. In the case a flag is set the bits following the flag may represent the ROI coordinates, e.g. the position of the top-left corner in the horizontal and vertical axis as well as the width and height of the ROI within the image area of decoded frames of a source video.

Figures 13A, 13B:
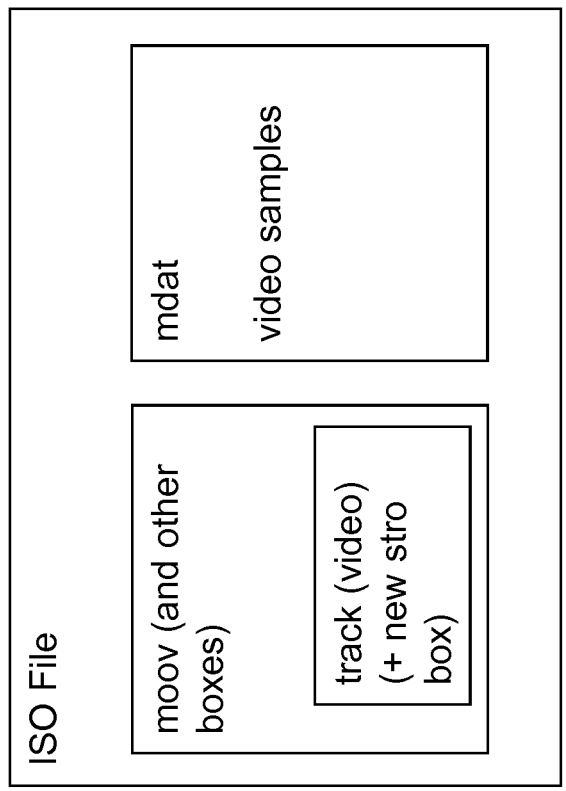
FIGS. 13A and 13B depict embodiments of the invention wherein the ROI data are transported in a new box of aMPEG-4 stream.

FIGS. 13A and 13B depict embodiments of the invention wherein the ROI data are transported in a video container.

In particular, these figures relate to embodiments wherein the ROI coordinates are transported in a video container such as the MP4 file format (ISO/IEC 14496-14). The general structure of such a file is described in FIG. 13A. The MP4 file format specifies a set of boxes, which constitutes a hierarchical structure to store and access the media data and metadata associated with it. For example, the root box for the metadata related to the content is the "moov" box whereas the media data is stored in the "mdat" box. More particularly the "stbl" box or "Sample Table Box" indexes the media samples of a track allowing to associate additional data with each sample. In case of a video track, a sample is a video frame. As a result adding a new box called "Sample ROI coordinates" or "stro" within the box "stbl" may be used to store the ROI coordinates for every frame of a video track. FIG. 13B depicts an embodiment of the invention wherein the ROI coordinates are transported in a new box "stro", comprising ROI coordinates for every video sample.

Figure 14:
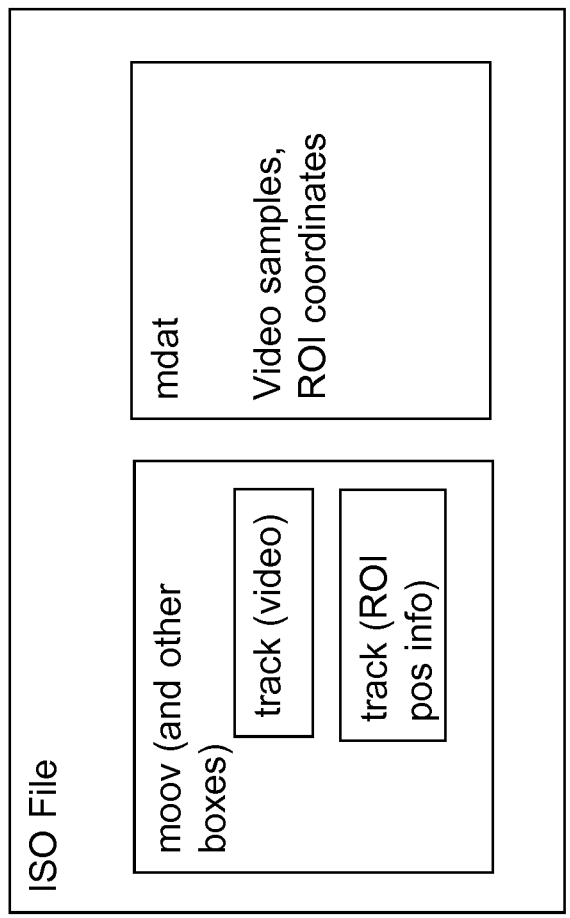
FIG. 14 depicts an embodiment of the invention wherein the ROI data are transported as a metadata track of aMPEG-4 stream.

FIG. 14 depicts an embodiment of the invention wherein the ROI position information is transported as a dedicated metadata track of aMPEG-4 stream. The ROI position information track follows the structure of a regular track (like audio or video), however the data therein are not video or audio frames but metadata containing the ROI coordinates.

The standard ISO/IEC 14496 part 12 provides a mechanism to include a timed metadata track within the ISO Base Media File Format (and by inheritance to the MP4 File format). In this embodiment the metadata track and the video track may be synchronized so that a sample of the ROI data track (e.g. ROI position information comprising a position of a ROI video frame, preferably ROI coordinates) is mapped to a sample (a video frame) of the (ROI) video track. This metadata track is characterized by a specific sample entry code for the client to be able to parse the actual data.

The ROI data track may in addition, or as an alternative to the 'synchronized' positions, contain time-shifted positions (e.g. look ahead positions) of ROI video frames. This means that when a ROI video frame is being received, the part of the metadata track that is then also being received may contain ROI position information related to ROI video frames that haven't been received yet. In practice, the metadata track is linked to the video track using a track-reference 'tref' box whose reference type is 'cdsc' and track_id the id of the referenced track.

As an alternative to the above embodiment the standard ISO/IEC 14496 part 30 called "Timed Text and Other Visual Overlays in ISO Base Media File Format" is aiming at including a timed text track within the ISO Base Media File Format (and by inheritance to the MP4 File format). In a further embodiment this subtitle track could be used in a similar manner as the metadata track of the embodiment above. However, the ROI coordinates are here transported in plain text as opposed to raw bytes.

In a further embodiment, the ROI Coordinates (ROI position information) may be delivered via an out-of-band file or stream to the client. Synchronization may be achieved using timestamps. In an embodiment, the ROI coordinates may be put in a file, which is retrieved before starting playback (e.g. in case of VoD streams), before or delivering the data via a WebSocket (in case of live streams).

Since in this case the ROI Coordinates are sent out-of-band with the actual video data, synchronization cannot be based on video container-internal information such as PTS values. Instead, content timestamps can be used. Such timestamps can either be based on content time (i.e. starting at 00:00:00 at the start of the video stream), or based on wallclock time (e.g. 20:31:11) for live broadcast streams. Similar timestamps should also be present in the video stream itself. For MPEG DASH or HLS streams, such timestamps may be provided by the MPD or manifest file. In the case where the ROI stream is delivered over e.g. DVB, DVB timeline packets inserted in the MPEG TS Multiplex (see 102 823) may be used.

In another embodiment, the ROI coordinates may be transported as a watermark in video (watermark). In a further embodiment, the ROI coordinates may be placed as watermarks in the ROI stream itself.

Figure 15B:
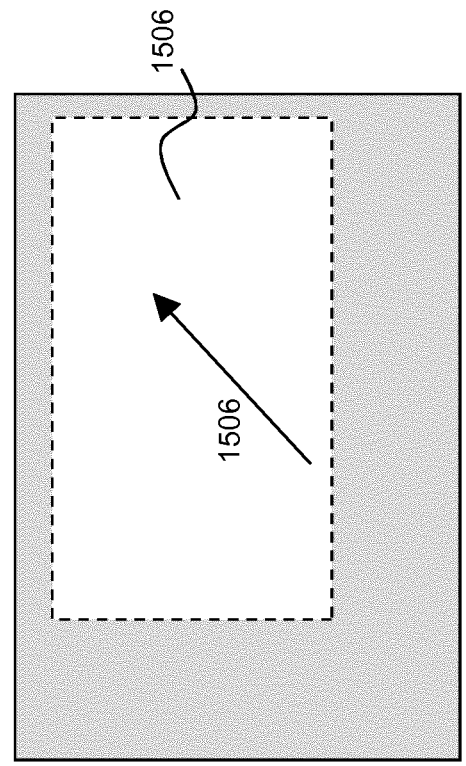
FIGS. 15A and 15B depicts the use of a spatial buffer for tiled streaming according to an embodiment of the invention.
Figure 15A:
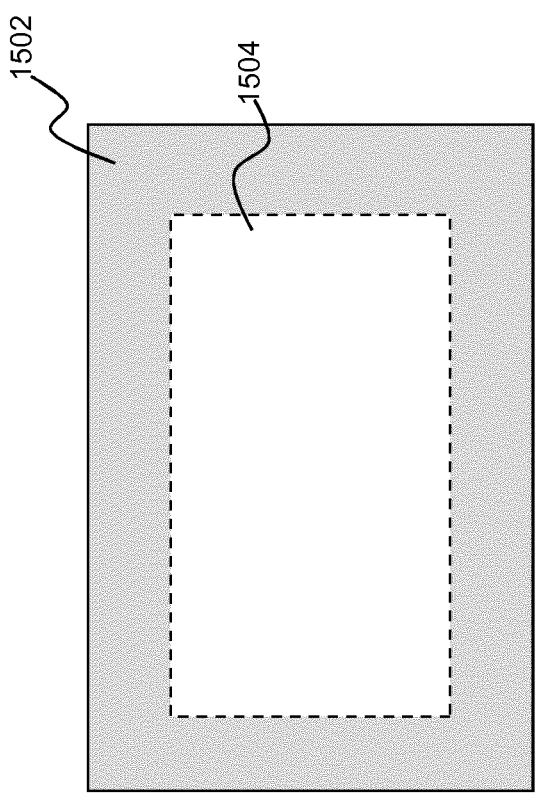

FIGS. 15A and 15B depict the use of a so-called "spatial buffer" for tiled streaming according to an embodiment of the invention. FIG. 15A depicts a ROI frame of a ROI stream wherein the ROI frame comprises a "spatial buffer" 1502, i.e. a peripheral region of image data (around a centred region of image 1504) that is transmitted to the client but that is not displayed when the user does not interact with the displayed content or when the user is not allowed to interact with the displayed content. Hence, in that case, the centre region that may be displayed when there is no user-interaction is cropped out of the ROI frame and displayed to the user.

Then, when the user interacts with the content,(part of) the ROI 1506 is navigated into the zone that is defined as the spatial buffer. However, because there is user-interaction display of image data from the spatial buffer is allowed. The user interaction may trigger the client to switch to the tiled streaming mode and request tiles on the basis of the ROI as described in detail with reference to FIG. 5-9 above. During the retrieval of the tile stream, the moving ROI 1508 may be displayed by cropping the ROI out of an image region that is partially located in the zone of the spatial buffer.

Figure 16:
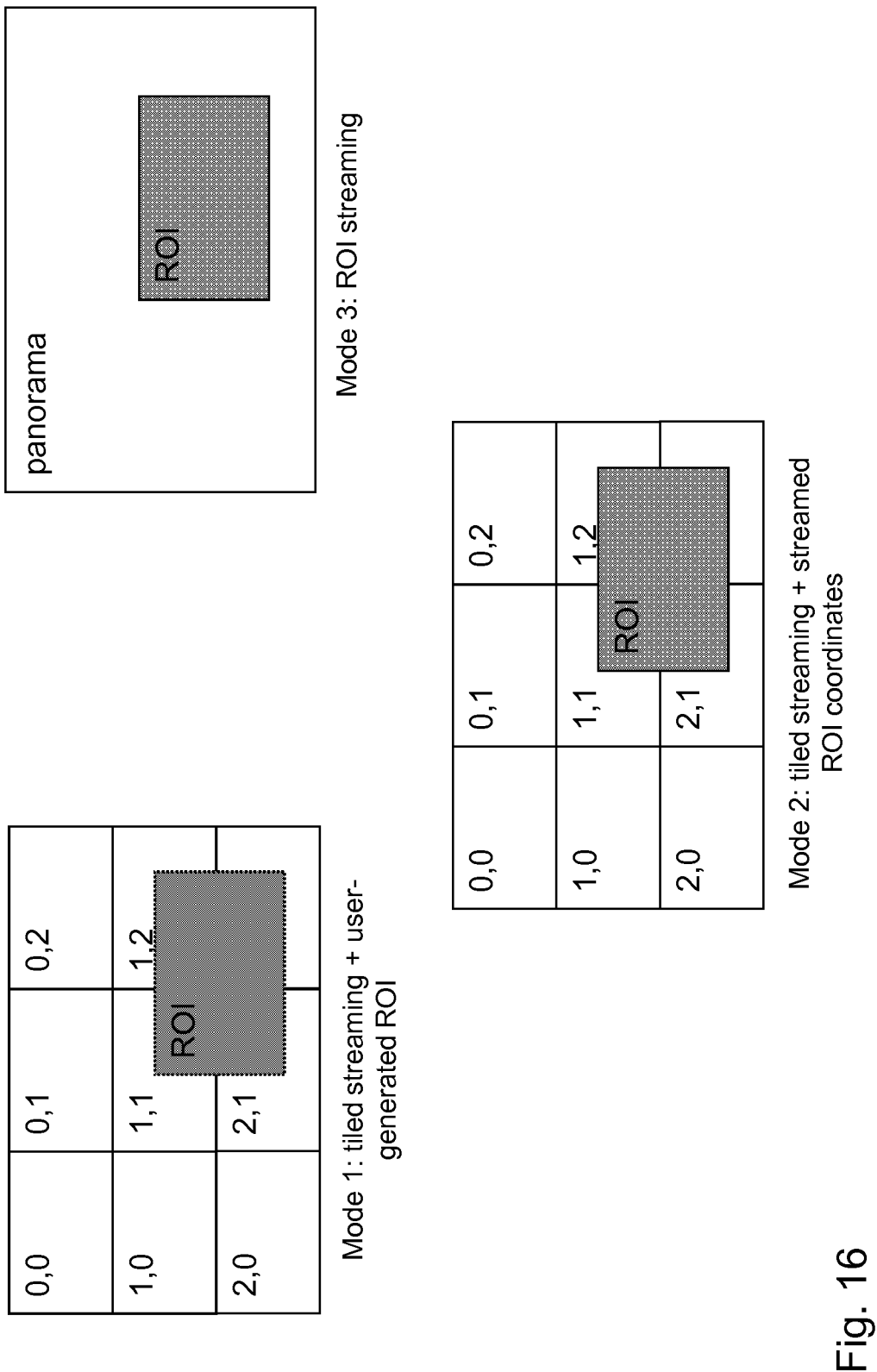
FIG. 16 depicts a three-mode ROI streaming model according to an embodiment of the invention.

FIG. 16 depicts a triple-mode ROI streaming model according to an embodiment of the invention. In this particular embodiment, a client may be in the tiled streaming mode (a first mode) wherein a user-generated ROI is rendered on the basis of four tiles. If the user stops interacting and would like to view the content in the ROI streaming mode (a third mode), the system may switch for a predetermined time to a second mode instead of switching immediately to the ROI streaming mode. In this second mode, the client stays in the tiled streaming mode while receiving ROI position information of the ROI stream. The client then uses the ROI position information in order to select the tiles and generate a cropped image on the basis of stitched synchronized tile frames as described in detail with reference to FIG. 5-9 above. If the user starts interacting with the displayed content, it may immediately switch to the tiled streaming mode (the first mode) for displaying a user-generated ROI. Inversely, if the client may predict that a user is about to interact or if a certain period is displayed wherein there is a high change that a user may interact with the content, the client may switch to the second mode so that the transition to the tiled streaming mode for displaying a user-generated ROI may be realized in a fast and smooth (seamless) way.

It is to be understood that any feature described in relation to any one embodiment may be used alone, or in combination with other features described, and may also be used in combination with one or more features of any other of the embodiments, or any combination of any other of the embodiments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Further, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions, which may for instance be organized as an object, procedure, or function. Nevertheless, the executables of an identified module need not be physically located together, but may comprise disparate instructions stored in different locations which, when joined logically together, comprise the module and achieve the stated purpose for the module. The invention is not limited to the embodiments described above, which may be varied within the scope of the accompanying claims.

The invention claimed is:

1. Method for providing one or more tile video streams to a client device, said one or more tile video streams capable of being used for rendering on a display a Region-Of-Interest (ROI) defining a sub-region within an image region associated with a source video, said method comprising:
  receiving at the client device, a Region-Of-Interest (ROI) video stream comprising video frames for rendering a first ROI defining a first sub-region within an image region associated with said source video, wherein each of the video frames has an image view when rendered, the image view defining the first ROI;
  providing at the client device ROI position information associated with at least one video frame of said ROI video stream received by said client device, said ROI position information comprising at least one first position of said first sub-region within said image region;

during the receiving of the ROI video stream, determining for retrieval, using said ROI position information and tile position information, one or more tile video streams associated with one or more tile sub-regions, at least part of said one or more tile sub-regions overlapping with said first sub-region, said tile position information comprising the positions of said one or more tile sub-regions within said image region; and subsequent to said determining, the client device requesting said one or more tile video streams.

2. Method according to claim 1, wherein providing said ROI position information comprises:

providing first ROI coordinates of at least a first image frame of said ROI video stream, said first ROI coordinates defining said first position of said first sub-region at the time of reception of an instruction by said client device, for rendering a second ROI on the basis of said one or more tile video streams.

3. Method according to claim 2 wherein said instruction comprises a ROI vector for indicating a change of said first sub-region and wherein said ROI vector is used for determining said one or more tile video streams.

4. Method according to claim 2 further comprising:

providing second ROI coordinates of at least a second image frame of said ROI video stream, said second ROI coordinates defining a second position of said first sub-region at the time of processing said one or more tile streams by said client device.

5. Method according to claim 2 comprising:

rendering said second ROI on the basis of said one or more tile sub-regions and said first ROI coordinates and/or second ROI coordinates.

6. Method according to claim 2 wherein said method further comprises:

forming a second sub-region on the basis of tile image frames associated with said one or more tile sub-regions;

cropping said second ROI out of said second sub-region.

7. Method according to claim 6, comprising: if said second sub-region is formed on the basis of two or more tile sub-regions, forming said second sub-region including: synchronizing two or more tile image frames of said two or more tile video streams and stitching said synchronized tile image frames into said second sub-region.

8. Method according to claim 1 wherein said one or more tile video streams are requested on the basis of a spatial manifest file comprising said tile position information, said tile position information comprising coordinates of said one or more tile sub-regions within said image region; said spatial manifest file further comprising one or more tile representations of said source video, a tile representation comprising one or more tile identifiers for identifying said one or more tile video streams, said one or more tile video streams being HTTP-based Adaptive Streaming type of streams.

9. Method according to claim 1, said ROI position information comprising ROI coordinates defining at least one position of said first sub-region within said image region, said first sub-region being defined by at least one image frame of said ROI video stream, wherein at least part of said ROI position information is transported in the bit stream of said ROI video stream to said client device; or, wherein at least part of said ROI position information is transported in an MPEG transport stream to the client device; or, as a DVB-defined SAD (Synchronized Auxiliary Data) packet in said MPEG transport stream; or, wherein at least part of said ROI position information is transported in a predefined box in an MPEG-4 stream; or, wherein at least part of said ROI position information is transported in a metadata track in a MPEG-4 stream; or, wherein at least part of said ROI position information is transported as a watermark to said client device.

10. Method according to claim 9, wherein at least part of said ROI position information is transported in the bit stream of said ROI video stream to said client device as a SEI message or a ROI coordinates flag defining the location of said ROI coordinates in said bit stream; or, wherein at least part of said ROI position information is transported in an elementary stream in said MPEG transport stream to the client device; or, as said DVB-defined SAD packet in said MPEG transport stream, said SAD packet comprising a time-shifted ROI coordinate; or, wherein at least part of said ROI position information is transported in said predefined box in an MPEG-4 stream, said predefined box comprising at least one of a moov, trak and stbl box of an MPEG-4 stream; or, wherein at least part of said ROI position information is transported in said metadata track in a MPEG-4 stream using a dedicated sample entry code; or, wherein at least part of said ROI position information is transported as said watermark to said client device in said ROI video stream.

11. Method according to claim 9 or claim 10, wherein said one or more tile video streams are requested on the basis of a spatial manifest file comprising said tile position information, said tile position information comprising coordinates of said one or more tile sub-regions within said image region; said spatial manifest file further comprising one or more tile representations of said source video, a tile representation comprising one or more tile identifiers for identifying said one or more tile video streams, said one or more tile video streams being HTTP-based Adaptive Streaming type of streams.

12. Method according to claim 1, wherein said ROI position information further comprises at least one look-ahead position associated with at least one video frame of said ROI video stream that is not yet received by said client device.

13. Method according to claim 12 wherein said at least one look-ahead position comprises one or more time-shifted first ROI coordinates of one or more image frames in said ROI video stream that are not yet received by said client device, said time-shifted first ROI coordinates being provided to said client device prior to said one or more image frames.

14. Method according to claim 13, said time-shifted ROI coordinates further being associated with time-shift information for determining said time-shift.

15. Client device comprising a client configured for providing a region-of-interest (ROI) on the basis of one or more tile video streams, said ROI defining a sub-region of an image region associated with a source video, said client being configured for:

receiving a Region-Of-Interest (ROI) video stream comprising video frames for rendering a first ROI defining a first sub-region within an image region associated with said source video, wherein each of the video frames has an image view when rendered, the image view defining the first ROI;

providing ROI position information associated with at least one video frame of said ROI video stream received by said client device, said ROI position information comprising at least one first position of said first sub-region within said image region;

and/or, at least one look-ahead position associated with at least one video frame of said ROI video stream that is not yet received by said client device;

during the receiving of the ROI video stream, determining for retrieval, using said ROI position information and tile position information, one or more tile video streams associated with one or more tile sub-regions, at least part of said one or more tile sub-regions overlapping with said first sub-region, said tile position information comprising the positions of said one or more tile sub-regions within said image region; and subsequent to said determining, requesting said one or more tile video streams.

16. Client device according to claim 15, said ROI position information comprising ROI coordinates defining at least one position of said first sub-region within said image region, said first sub-region being defined by at least one image frame of said ROI video stream, wherein at least part of said ROI position information is transported in the bit stream of said ROI video stream to said client device; or, wherein at least part of said ROI position information is transported in an MPEG transport stream to the client device; or, as a DVB-defined SAD (Synchronized Auxiliary Data) packet in said MPEG transport stream; or, wherein at least part of said ROI position information is transported in a predefined box in an MPEG-4 stream; or, wherein at least part of said ROI position information is transported in a metadata track in a MPEG-4 stream; or, wherein at least part of said ROI position information is transported as a watermark to said client device.

17. Client device according to claim 16, wherein at least part of said ROI position information is transported in the bit stream of said ROI video stream to said client device as a SEI message or a ROI coordinates flag defining the location of said ROI coordinates in said bit stream; or, wherein at least part of said ROI position information is transported in an elementary transport stream in said MPEG transport stream to the client device; or, as said DVB-defined SAD packet in said MPEG transport stream, said SAD packet comprising a time-shifted ROI coordinate; or, wherein at least part of said ROI position information is transported in said predefined box in an MPEG-4 stream, said predefined box comprising at least one of a moov, trak and stbl box of an MPEG-4 stream; or, wherein at least part of said ROI position information is transported in said metadata track in a MPEG-4 stream using a dedicated sample entry code; or, wherein at least part of said ROI position information is transported as said watermark to said client device in said ROI video stream.

18. Client device according to claim 15 or claim 16 or claim 17, wherein requesting said one or more tile video streams is based on a spatial manifest file comprising said tile position information, said tile position information comprising coordinates of said one or more tile sub-regions within said image region; said spatial manifest file further comprising one or more tile representations of said source video, a tile representation comprising one or more tile identifiers for identifying said one or more tile video streams, said one or more tile video streams being HTTP-based Adaptive Streaming type of streams.

19. A computer program product, implemented on a computer-readable non-transitory storage medium, comprising software code portions configured for, when run in the memory of a computer, executing the method steps according to claim 1.

* * * * *